United States Patent
Leavitt et al.

(10) Patent No.: US 10,471,702 B2
(45) Date of Patent: Nov. 12, 2019

(54) ADDITIVE MANUFACTURING SYSTEMS AND METHOD OF FILLING VOIDS IN 3D PARTS

(71) Applicant: Stratasys, Inc., Eden Prairie, MN (US)

(72) Inventors: Paul J. Leavitt, Minneapolis, MN (US); J. Samuel Batchelder, Somers, NY (US)

(73) Assignee: STRATASYS, INC., Eden Prairie, MN (US)

( * ) Notice: Subject to any disclaimer, the term of this patent is extended or adjusted under 35 U.S.C. 154(b) by 333 days.

(21) Appl. No.: 15/376,050

(22) Filed: Dec. 12, 2016

(65) Prior Publication Data
US 2017/0165920 A1    Jun. 15, 2017

Related U.S. Application Data

(60) Provisional application No. 62/266,313, filed on Dec. 11, 2015.

(51) Int. Cl.
| | |
|---|---|
| *B33Y 70/00* | (2015.01) |
| *B33Y 10/00* | (2015.01) |
| *B33Y 30/00* | (2015.01) |
| *B33Y 50/02* | (2015.01) |
| *B29C 64/118* | (2017.01) |
| *B29K 279/00* | (2006.01) |
| *B29C 64/386* | (2017.01) |

(52) U.S. Cl.
CPC ............ *B33Y 70/00* (2014.12); *B29C 64/118* (2017.08); *B33Y 10/00* (2014.12); *B33Y 30/00* (2014.12); *B33Y 50/02* (2014.12); *B29C 64/386* (2017.08); *B29K 2279/085* (2013.01)

(58) Field of Classification Search
CPC ..................................................... B33Y 70/00
See application file for complete search history.

(56) References Cited

U.S. PATENT DOCUMENTS

| | | | |
|---|---|---|---|
| 5,503,785 | A | 4/1996 | Crump et al. |
| 6,004,124 | A | 12/1999 | Swanson et al. |
| 7,127,309 | B2 | 10/2006 | Dunn et al. |
| 7,384,255 | B2 | 6/2008 | LaBossiere et al. |
| 7,604,470 | B2 | 10/2009 | LaBossiere et al. |
| 7,896,209 | B2 | 3/2011 | Batchelder et al. |
| 7,897,074 | B2 | 3/2011 | Batchelder et al. |
| 8,153,182 | B2 | 4/2012 | Comb et al. |
| 8,403,658 | B2 | 3/2013 | Swanson |
| 8,647,102 | B2 | 2/2014 | Swanson et al. |
| 2013/0078073 | A1 | 3/2013 | Comb et al. |
| 2013/0161432 | A1 | 6/2013 | Mannella et al. |
| 2013/0161442 | A1 | 6/2013 | Mannella et al. |
| 2014/0158802 | A1 | 6/2014 | Batchelder et al. |

*Primary Examiner* — Larry W Thrower
(74) *Attorney, Agent, or Firm* — Westman, Champlin & Koehler, P.A.

(57) ABSTRACT

A method of additive three-dimensional object production includes depositing liquefied material to produce two roads and placing an extruder tip having a bottom surface that surrounds an orifice such that one portion of the bottom surface is sealed against one of the two roads and another part of the bottom surface is sealed against the other of the two roads and the orifice is positioned over a space between the two roads. Liquefied material is then extruded through the orifice to fill the space between the two roads.

10 Claims, 20 Drawing Sheets

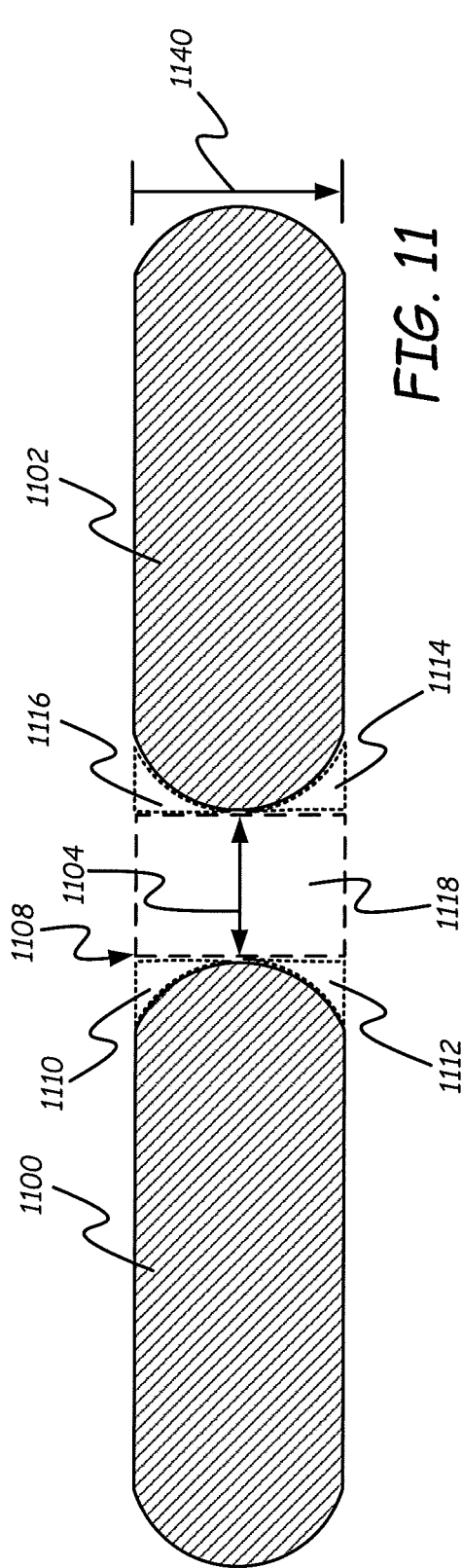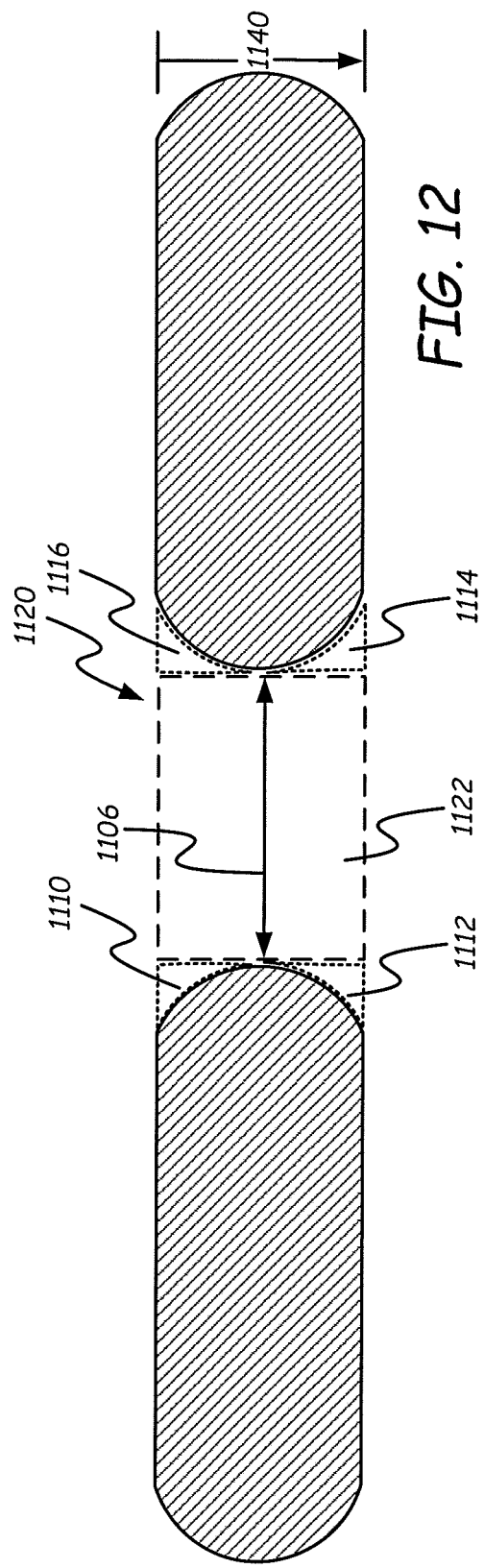

ADDITIVE MANUFACTURING SYSTEMS AND METHOD OF FILLING VOIDS IN 3D PARTS

CROSS-REFERENCE TO RELATED APPLICATION

The present application is based on and claims the benefit of U.S. provisional patent application Ser. No. 62/266,313, filed Dec. 11, 2015, the content of which is hereby incorporated by reference in its entirety.

BACKGROUND

The present disclosure relates to additive manufacturing systems for printing or otherwise producing three-dimensional (3D) parts and support structures. In particular, the present disclosure relates to toolpaths for printing 3D parts and support structures in a layer-by-layer manner using an additive manufacturing technique.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, high speed sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a platen in planar layers. The extruded part material fuses to previously deposited part material, and solidifies upon a drop in temperature. The position of the print head relative to the substrate is then incremented, and the process is repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited pursuant to the generated geometry during the printing process. The support material adheres to the part material during fabrication, and is removable from the completed 3D part when the printing process is complete.

SUMMARY

An aspect of the present disclosure is directed to a method of additive three-dimensional object production includes depositing liquefied material to produce two roads and placing an extruder tip having a bottom surface that surrounds an orifice such that one portion of the bottom surface is sealed against one of the two roads and another part of the bottom surface is sealed against the other of the two roads and the orifice is positioned over a space between the two roads. Liquefied material is then extruded through the orifice to fill the space between the two roads.

Another aspect of the present disclosure is directed to an additive manufacturing system that includes a nozzle having an orifice surround by a bottom surface. A controller in the system receives instructions to print along two tool paths and to print along a void filling path between the two tool paths. The controller sends control signals to print two roads corresponding to the two tool paths. The controller then sends control signals to move the nozzle along the void filling path between the two roads such that the two roads remain in contact with the bottom surface of the nozzle while the controller also sends control signals to extrude material to fill a void between the two roads.

In a still further aspect, a method comprises extruding material from an extruder tip of an additive manufacturing system such that the extruded material flows beneath and between portions of two previously extruded roads of material.

DEFINITIONS

Unless otherwise specified, the following terms as used herein have the meanings provided below:

The terms "preferred", "preferably", "example" and "exemplary" refer to embodiments of the invention that may afford certain benefits, under certain circumstances. However, other embodiments may also be preferred or exemplary, under the same or other circumstances. Furthermore, the recitation of one or more preferred or exemplary embodiments does not imply that other embodiments are not useful, and is not intended to exclude other embodiments from the scope of the present disclosure.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a material", when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

BRIEF DESCRIPTION OF THE DRAWINGS

FIG. 11 is an enlarged sectional view of two spaced apart roads with a first spacing.

FIG. 12 is a sectional view of two spaced apart roads with a second spacing.

DETAILED DESCRIPTION

One of the main issues with extrusion-based additive manufacturing is part strength. In particular, parts made with extrusion-based additive manufacturing tend to be more brittle than injection molded parts and tend to have much higher anisotropic part strength (stronger in one direction than another). For example, for one extrusion-based additive manufacturing technique, parts made from ULTEM™ 9085 resin elongate 2.2% before breaking in the Z direction while injection-molded parts made of ULTEM™ 9085 resin elongate 72% before breaking in the Z direction. Thus, the injection-molded parts are 32 times less brittle than the additive manufacturing parts. Further, a part made from ULTEM™ 9085 resin using the extrusion-based additive manufacturing technique has high isotropic part strength with a Tensile Strength, Ultimate in the Z direction of 42 MPa and a Tensile Strength, Ultimate in the XY directions of 69 MPa. This means that the part is only 61% as strong in the Z direction as in the XY directions. Injection molded parts made from ULTEM™ 9085 resin do not have isotropic strengths of this magnitude.

One of the key causes of poor part strength and the higher isotropic part strength is porosity in the additive-manufacturing parts. Embodiments describe below fill parts to a much higher percentage which reduces the isotropic nature of the part strength and increases Z part strength.

Embodiments described herein generate tool paths for printing spaced-apart roads such that neighboring roads are not in contact with each other. The spacing is set such that portions of a bottom surface of a print nozzle can seal against a top surface of two neighboring spaced apart roads while the nozzle extrudes material to fill the voids between the two roads. As a result of the sealing between the bottom surface of the nozzle and the previously printed roads, the extrudate is forced into the voids formed underneath portions of each of the previously printed roads. In some embodiments, the amount of material extruded to fill the voids is calculated based on the shapes of the previously printed roads and the spacing between the previously printed roads. In other embodiments, pressure feedback is used to adjust the amount of material extruded through the nozzle. Examples of such pressure feedback include a strain gauge on the nozzle, a pressure gauge fluidically coupled to the molten material in the nozzle and an accumulator that receives molten material when the pressure of the molten material exceeds a threshold pressure and that releases molten material when the pressure once again drops below the threshold. In still further embodiments, radar sensors are used to sense the volume of the voids between two previously printed roads and this volume is used to adjust the amount of material deposited in the void.

Figure 1:
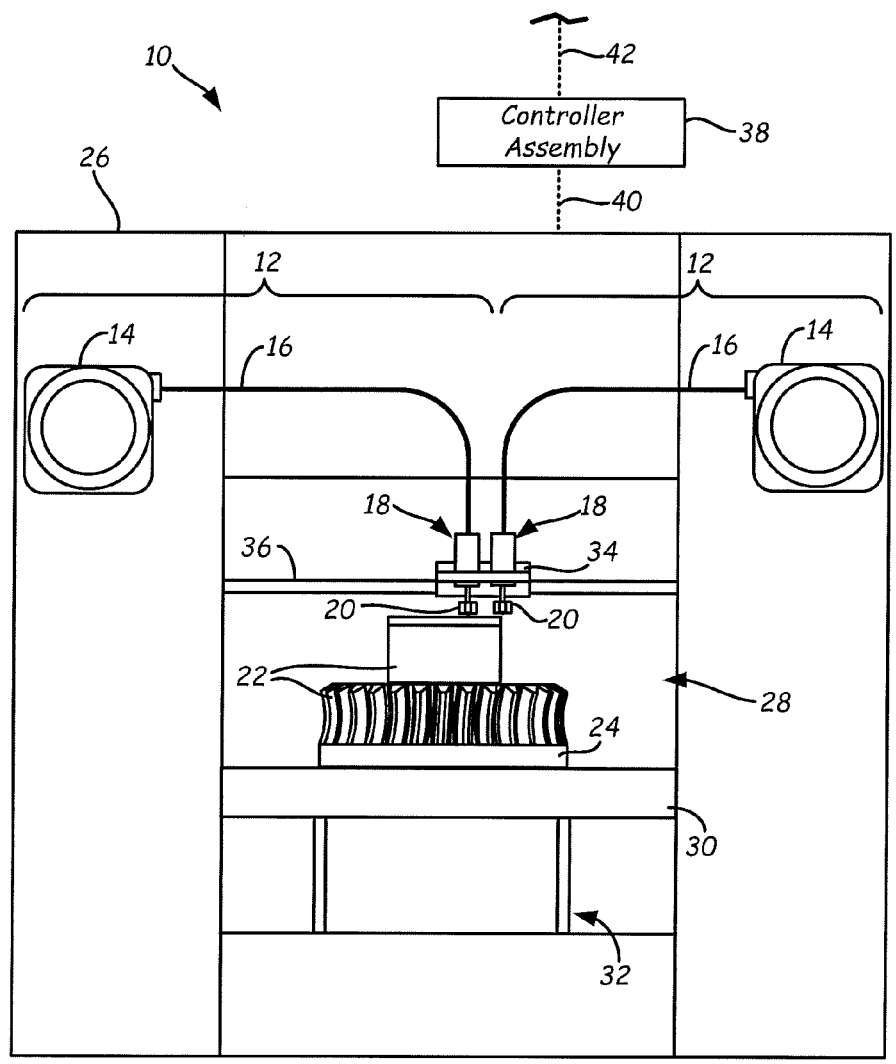
FIG. 1 is a front view of an additive manufacturing system configured to print 3D parts and support structures with the use of one or more print head liquefier assemblies of the present disclosure.

Embodiments of the present disclosure may be used with any suitable extrusion-based additive manufacturing system. FIG. 1 shows one such system 10 that is an additive manufacturing system for printing 3D parts or models and corresponding support structures (e.g., 3D part 22 and support structure 24) from part and support material filaments, respectively, of consumable assemblies 12, using a layer-based, additive manufacturing technique. Suitable additive manufacturing systems for system 10 include extrusion-based systems developed by Stratasys, Inc., Eden Prairie, Minn., such as fused deposition modeling systems under the trademark "FDM".

In FIG. 1, there are two consumable assemblies 12, where one of the consumable assemblies 12 contains a part material filament, and the other consumable assembly 12 contains a support material filament. However, both consumable assemblies 12 may contain part material filaments in some embodiments. Each consumable assembly 12 is an easily loadable, removable, and replaceable container device that retains a supply of a consumable filament for printing.

In the shown embodiment, each consumable assembly 12 includes container portion 14, guide tube 16, and print heads 18, where each print head 18 preferably includes an extruder 20 of the present disclosure. Container portion 14 may retain a spool, coil, or other supply arrangement of a consumable filament, such as discussed in Mannella et al., U.S. Publication Nos. 2013/0161432 and 2013/0161442; and in Batchelder et al., U.S. Publication No. 2014/0158802.

Guide tube 16 interconnects container portion 14 and print head 18, where a drive mechanism of print head 18 (and/or of system 10) draws successive segments of the consumable filament from container portion 14, through guide tube 16, to the extruder 20 of the print head 18. In this embodiment, guide tube 16 and print head 18 are subcomponents of consumable assembly 12, and may be interchanged to and from system 10 with each consumable assembly 12. Alternatively, as discussed below, guide tube 16 and/or print head 18 (or parts thereof) may be components of system 10, rather than subcomponents of consumable assemblies 12.

As shown, system 10 includes system housing 26, chamber 28, platen 30, platen gantry 32, head carriage 34, and head gantry 36. System housing 26 is a structural component of system 10 and may include multiple structural subcomponents such as support frames, housing walls, and the like. In some embodiments, system housing 26 may include container bays configured to receive container portions 14 of consumable assemblies 12. In alternative embodiments, the container bays may be omitted to reduce the overall footprint of system 10. In these embodiments, container portions 14 may stand adjacent to system housing 26, while providing sufficient ranges of movement for guide tubes 16 and print heads 18.

Chamber 28 is an enclosed environment that contains platen 30 for printing 3D part 22 and support structure 24. Chamber 28 may be heated (e.g., with circulating heated air) to reduce the rate at which the part and support materials solidify after being extruded and deposited (e.g., to reduce distortions and curling). In alternative embodiments, chamber 28 may be omitted and/or replaced with different types of build environments. For example, 3D part 22 and support structure 24 may be built in a build environment that is open to ambient conditions or may be enclosed with alternative structures (e.g., flexible curtains).

Platen 30 is a platform on which 3D part 22 and support structure 24 are printed in a layer-by-layer manner, and is supported by platen gantry 32. In some embodiments, platen 30 may engage and support a build substrate, which may be a tray substrate as disclosed in Dunn et al., U.S. Pat. No. 7,127,309, fabricated from plastic, corrugated cardboard, or other suitable material, and may also include a flexible polymeric film or liner, painter's tape, polyimide tape (e.g., under the trademark KAPTON from E.I. du Pont de Nemours and Company, Wilmington, Del.), or other disposable fabrication for adhering deposited material onto the platen 30 or onto the build substrate. Platen gantry 32 is a gantry assembly configured to move platen 30 along (or substantially along) the vertical z-axis.

Head carriage 34 is a unit configured to receive one or more removable print heads, such as print heads 18, and is supported by head gantry 36. Examples of suitable devices for head carriage 34, and techniques for retaining print heads 18 in head carriage 34, include those disclosed in Swanson et al., U.S. Pat. Nos. 8,403,658 and 8,647,102. In some preferred embodiments, each print head 18 is configured to engage with head carriage 34 to securely retain the print head 18 in a manner that prevents or restricts movement of the print head 18 relative to head carriage 34 in the x-y build plane, but allows the print head 18 to be controllably moved out of the x-y build plane (e.g., servoed, toggled, or otherwise switched in a linear or pivoting manner).

Head gantry 36 is a belt-driven gantry assembly configured to move head carriage 34 (and the retained print heads 18) in (or substantially in) a horizontal x-y plane above chamber 28. Examples of suitable gantry assemblies for head gantry 36 include those disclosed in Comb et al., U.S. Publication No. 2013/0078073, where head gantry 36 may also support deformable baffles (not shown) that define a ceiling for chamber 28. In alternative embodiments, head gantry 36 may utilize any suitable mechanism for moving head carriage 34 (and the retained print heads 18), such as robotic actuators, and the like.

In a further alternative embodiment, platen 30 may be configured to move in the horizontal x-y plane within chamber 28, and head carriage 34 (and print heads 18) may be configured to move along the z-axis. Other similar arrangements may also be used such that one or both of platen 30 and print heads 18 are moveable relative to each other. Platen 30 and head carriage 34 (and print heads 18) may also be oriented along different axes. For example, platen 30 may be oriented vertically and print heads 18 may print 3D part 22 and support structure 24 along the x-axis or the y-axis. In another example, platen 30 and/or head carriage 34 (and print heads 18) may be moved relative to each other in a non-Cartesian coordinate system, such as in a polar coordinate system.

Additional examples of suitable devices for print heads 18, and the connections between print heads 18, head carriage 34, and head gantry 36 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Batchelder et al., U.S. Pat. Nos. 7,896, 209 and 7,897,074; and Comb et al., U.S. Pat. No. 8,153, 182. For instance, extruder 20 may optionally be retrofitted into an existing additive manufacturing system.

System 10 also includes controller assembly 38, which is one or more computer-based systems configured to operate the components of system 10. Controller assembly 38 may communicate over communication line(s) 40 with the various components of system 10, such as print heads 18 (including extruder 20), chamber 28 (e.g., with a heating unit for chamber 28), head carriage 34, motors for platen gantry 32 and head gantry 36, and various sensors, calibration devices, display devices, and/or user input devices.

Additionally, controller assembly 38 may also communicate over communication line 42 with external devices, such as other computers and servers over a network connection (e.g., a local area network (LAN) connection, a universal serial bus (USB) connection, or the like). While communication lines 40 and 42 are each illustrated as a single signal line, they may each include one or more electrical, optical, and/or wireless signal lines and intermediate control circuits, where portions of communication line(s) 40 may also be subcomponents of the removable print heads 18.

In some embodiments, the one or more computer-based systems of controller assembly 38 are internal to system 10, allowing a user to operate system 10 over a network communication line 42, such as from an external computer in the same or similar manner as a two-dimensional printer. Alternatively, controller assembly 38 may also include one or more external computer-based systems (e.g., desktop, laptop, server-based, cloud-based, tablet, mobile media device, and the like) that may communicate with the internal computer-based system(s) of controller assembly 38, as well as communicating over a network via communication line 42.

In this alternative embodiment, the processing functions of controller assembly 38 discussed below may be divided between the internal and external computer-based systems. In yet another alternative embodiment, the computer-based system(s) of controller assembly 38 may all be located external to system 10 (e.g., one or more external computers), and may communicate with system 10 over communication line(s) 40.

During a printing operation, controller assembly 38 may direct platen gantry 32 to move platen 30 to a predetermined height within chamber 28. Controller assembly 38 may then direct head gantry 36 to move head carriage 34 (and the retained print heads 18) around in the horizontal x-y plane above chamber 28. Controller assembly 38 may also command print heads 18 to selectively draw successive segments of the consumable filaments from container portions 14 and through guide tubes 16, respectively.

The successive segments of each consumable filament are then melted in the extruder 20 of the respective print head 18 to produce a molten material, as discussed below. Upon exiting extruder 20, the resulting extrudate may be deposited onto platen 30 as a series of roads for printing 3D part 22 or support structure 24 in a layer-by-layer manner. After the print operation is complete, the resulting 3D part 22 and support structure 24 may be removed from chamber 28, and support structure 24 may be removed from 3D part 22. 3D part 22 may then undergo one or more additional post-processing steps, as desired.

Figure 2:
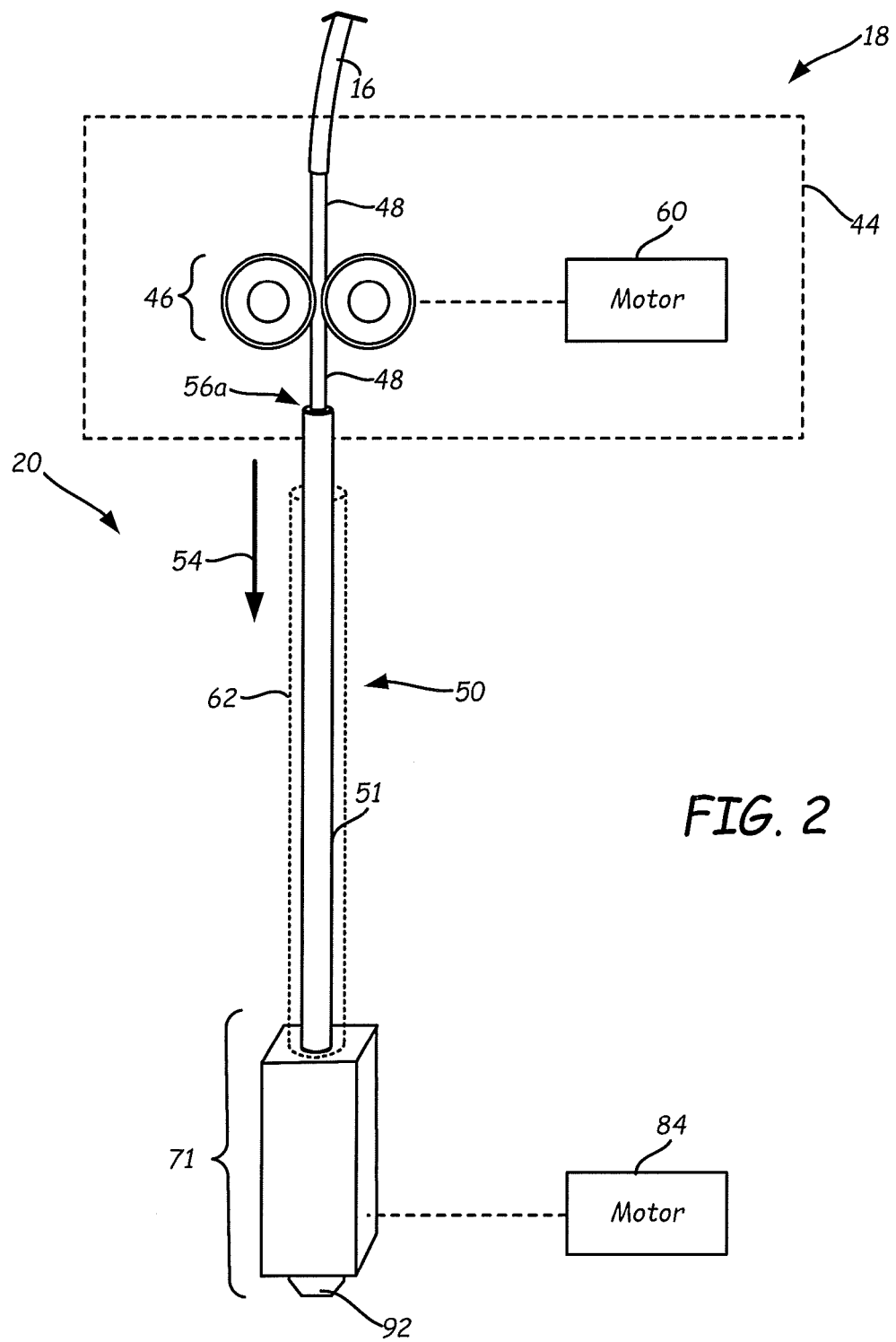
FIG. 2 is a plan view of an exemplary print head 18.

FIG. 2 is a plan view of an example print head 18, which includes a housing 44, a drive mechanism 46, and an extruder 20, which are shown in use with a filament 48. Drive mechanism 46 is a filament drive mechanism that is configured to feed successive segments of filament 48 from guide tube 16 to extruder 20. In particular, drive mechanism 46 is driven by a motor 60 (e.g., a step motor), based on commands from controller assembly 38, to feed filament 48 into inlet end 56*a* of a liquefier 50 in a direction 54.

Liquefier 50 includes a hollow tube 51, which is surrounded by a heater assembly 62. Hollow tube 51 is generally thin-walled and thermally conductive and has a geometry that matches the cross-sectional shape of filament 48. Heater assembly 62 is in contact with one or more portions of hollow tube 51 and includes one or more heating elements that generate and transfer heat to hollow tube 51. The transferred heat melts the received filament 48 within hollow tube 51, thereby producing a molten material of filament 48.

Hollow tube 51 is connected to a casing assembly 71, which connects the interior of hollow tube 51 to the interior of an extrusion nozzle or extruder tip 92. (Casing assembly 71 is not shown to scale in FIG. 2) In some embodiments, casing assembly 71 also contains a gear pump that is driven by a motor 84 based on commands from controller assembly 38. Molten material in the interior of hollow tube 51 passes through casing assembly 71 and into the interior of extrusion nozzle 92. Pressure within casing assembly 71 forces the molten material out of an orifice in nozzle 92 to form an extrudate as discussed further below.

During a printing operation, controller assembly 38 (shown in FIG. 1) commands drive mechanism 46 (via motor 60) (shown in FIG. 2) to feed successive segments of filament 48 into inlet end 56*a* of liquefier 50. As filament 48 passes through liquefier 50, heater assembly 62 thermally melts the received successive segments, where the molten portion of the filament material forms a meniscus around the unmelted portion of filament 48. The downward movement of filament 48 functions as a viscosity pump to pressurize the molten material and force it from liquefier 50 into casing assembly 71. The pressurized molten material then either exits nozzle 92 based on the pressure provided by the downward movement of filament 48 or is pumped out of nozzle 92 by a gear pump in casing assembly 71 as discussed in connection with FIG. 3.

Figure 3:
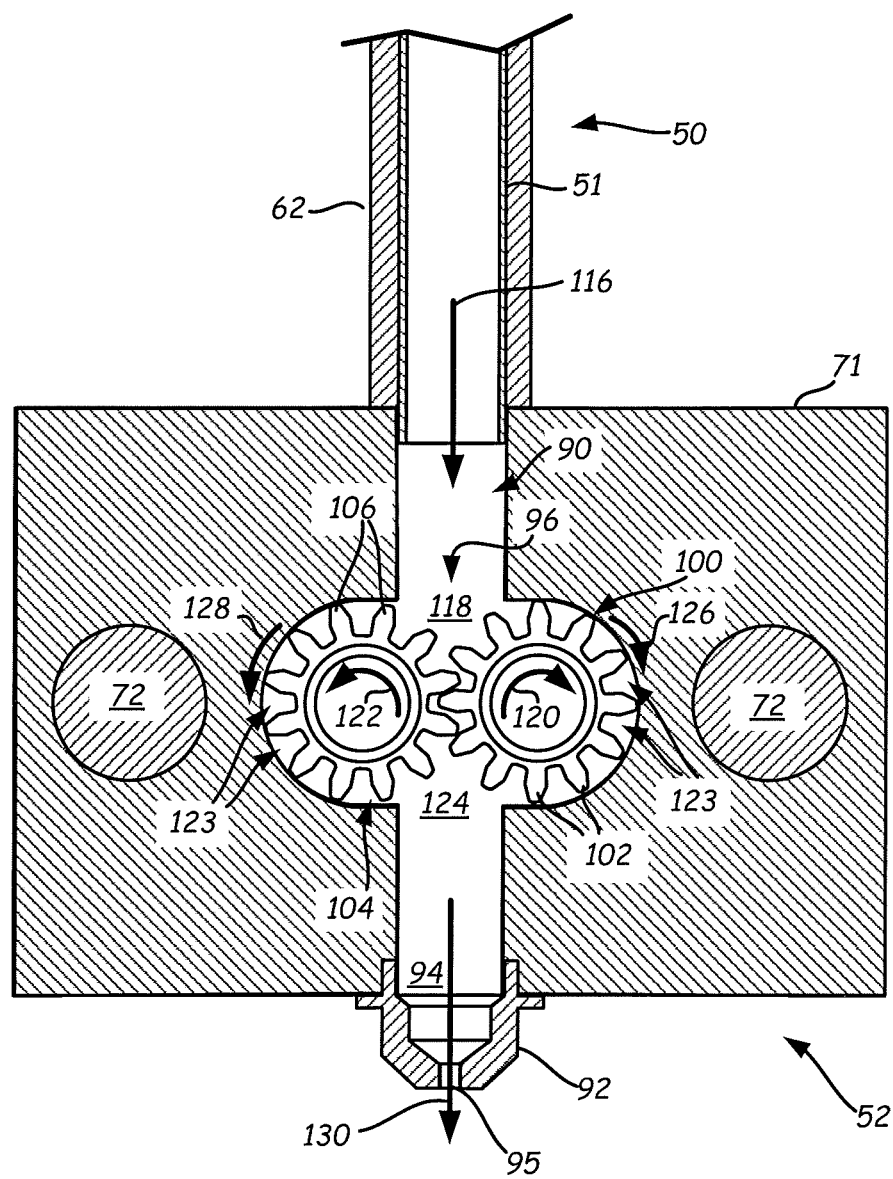
FIG. 3 is a sectional view of a casing assembly of an exemplary print head in accordance with one embodiment.

FIG. 3 provides a sectional view of casing assembly 71 for an embodiment in which a gear pump assembly 52 is housed within casing assembly 71. As shown in FIG. 3, gear pump assembly 52 includes heating elements 72 that extend through and heat casing assembly 71. This prevents the received molten filament materials from cooling down and/or solidifying within gear pump assembly 52 while print head 18 is printing.

Gear pump assembly 52 also includes gears 100 and 104 which are turned by motor 84. Pressurized molten material flows from hollow tube 51 into inlet opening 90 of casing assembly 71, as depicted by arrow 116. This fills an upper region 118 and inlet opening 90 with the pressurized molten material. Engaged teeth 102 and 106 of gears 100 and 104 prevent the received molten material from flowing directly down between gears 100 and 104 into outlet opening 94, unless or until the gears are rotated.

Controller assembly 38 may direct motor 84 to rotate gears 100 and 104 in directions 120 and 122, respectively. The molten material is then carried around gears 100 and 104 in the interstitial spaces between teeth 102 and 106 and the walls of interior cavity 96 (referred to as interstitial spaces 123) to a lower region 124 of interior cavity 96, as depicted by arrows 126 and 128. The continued driving of the molten material around gears 100 and 104 in this manner forces the molten material in lower region 124 downward through outlet opening 94 and an orifice 95 of nozzle 92 to extrude the molten material in a controlled manner, as depicted by arrow 130.

Figure 4:
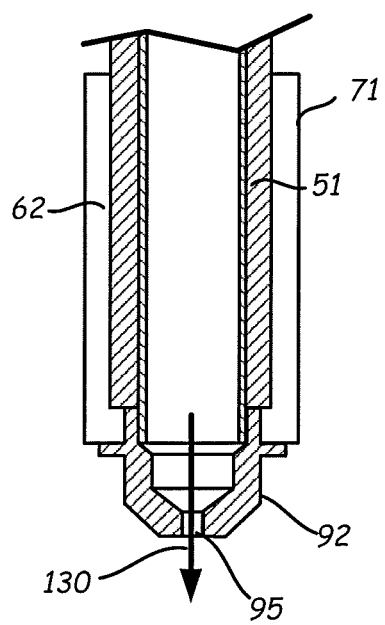
FIG. 4 is a sectional view of a casing assembly of a print head in accordance with a second embodiment.

FIG. 4 provides sectional view of an alternative embodiment of casing assembly 71 in which hollow tube 51 and heater assembly 62 extend into casing assembly 71. The interior of nozzle 92 is connected to the interior of hollow tube 51 within casing assembly 71, thereby allowing molten material in hollow tube 51 to flow out of orifice 95 of nozzle 92 based on the pressure generated by the downward movement of filament 48.

Figure 5:
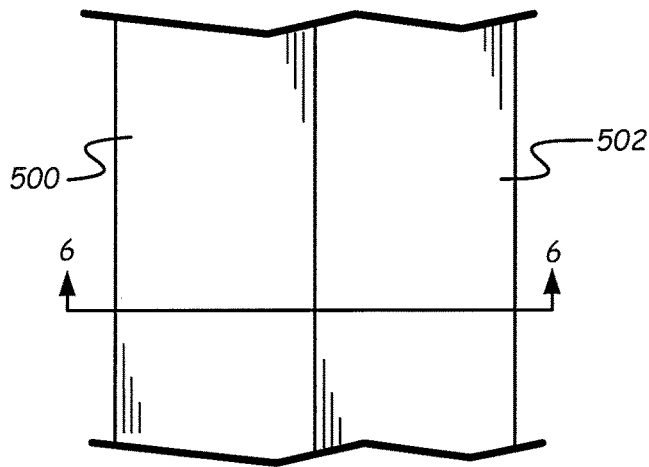
FIG. 5 is a top view of two neighboring printed roads under the prior art.
Figure 6:
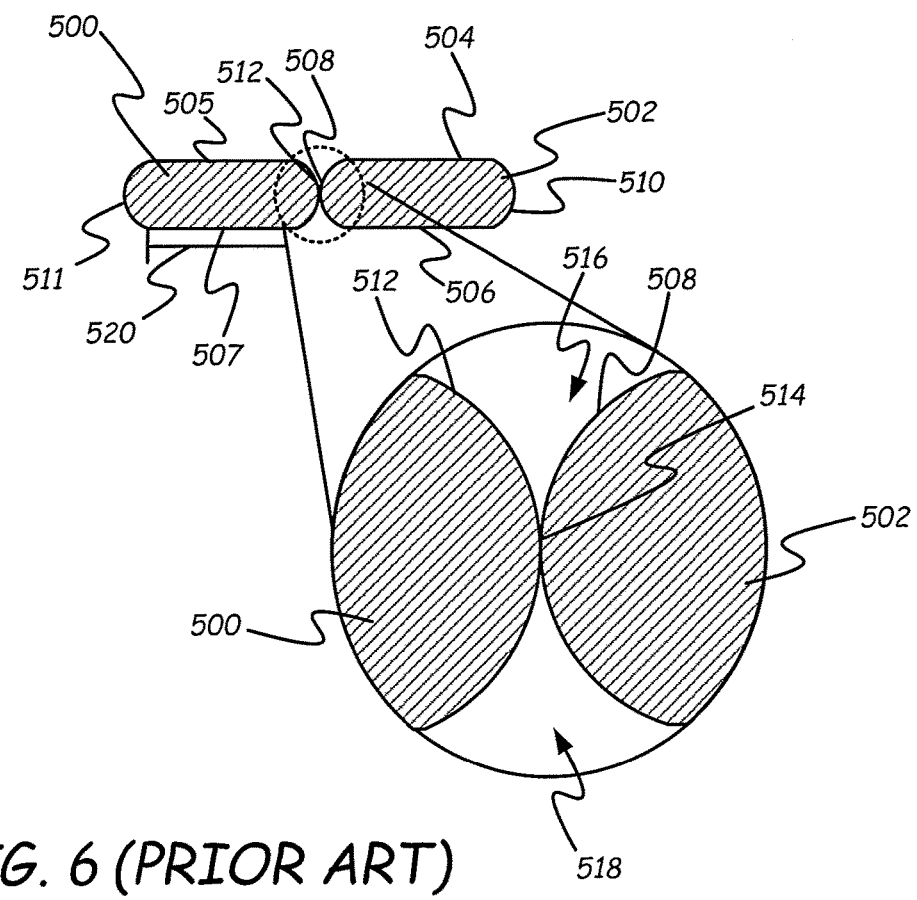
FIG. 6 is a sectional view of the two printed roads of FIG. 5.

FIG. 5 provides a top view of neighboring roads under the prior art and FIG. 6 provides a sectional view of FIG. 5 along lines 6-6 of FIG. 5. In FIG. 5, two neighboring roads 500 and 502 have been deposited. As shown in FIG. 6, roads 500 and 502 have obround shapes that include a flat top surface, such as top surfaces 505 and 504, a flat bottom surface, such as bottom surfaces 507 and 506 and two rounded side surfaces, such as opposing side surfaces 511 and 512 of road 500 and opposing side surfaces 508 and 510 of road 502. As shown in the magnified portion of FIG. 6, the rounded side ends 512 and 508 of roads 500 and 502 make contact at a central point 514. However, above and below this point are two voids 516 and 518, respectively, where void 518 extends below side surfaces 512 and 508 and void 516 extends above side surfaces 512 and 508.

Voids 516 and 518 create a weakness in the layer of material since the material layer is thinner along the line of contact between roads 500 and 502 than at the center of roads 500 and 502. As a result, the lines of contacts between roads tend to be the sites of structural failures in additive manufacturing parts. To combat this weakness, attempts have been made to expand the width of the flat portions of the roads, such as width 520 of road 500. However increasing the width of the roads does not remove the lines of failure since the roads continue to have rounded sides. In other techniques, when printing a road next to an existing road, the prior art has attempted to ensure that the orifice of the nozzle extruding the molten material is as close as possible to the previously deposited road with the hopes that positioning the nozzle in this way will force material into the void beneath the previously deposited road. Such techniques, however, have been unable to completely fill the voids because the path of least resistance for the molten material is away from the previously deposited road. As a result, instead of being forced into the void, the molten material flows away from the previously deposited road without filling the voids.

In accordance with the various embodiments described below, controller assembly 38 receives tool paths for printing roads such that the roads are spaced apart from each other. Controller assembly 38 also receives void filling tool paths for filling the voids between the side surfaces of the printed roads. Controller assembly 38 cause the roads to be printed by sending instructions to move the nozzle along the tool paths for the roads while also sending instructions to extrude molten material. Once the roads are formed, controller assembly 38 sends instructions to move the nozzle along the void-filling tool path between the two roads such that a bottom surface of the nozzle remains in contact with the two roads while controller assembly 38 sends control signals to extrude material to fill the voids between the two roads.

Figure 7:
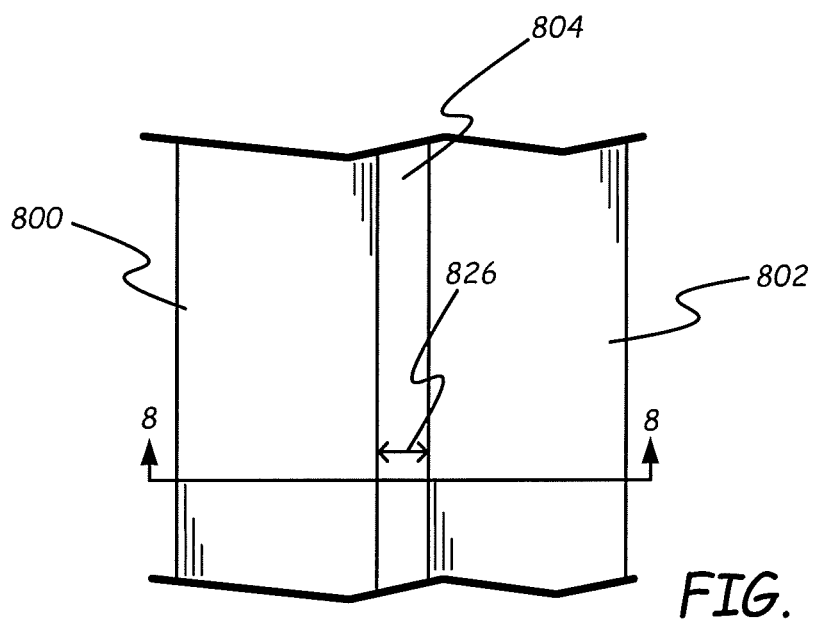
FIG. 7 is a top view of two spaced roads printed in accordance with some embodiments.
Figure 8:
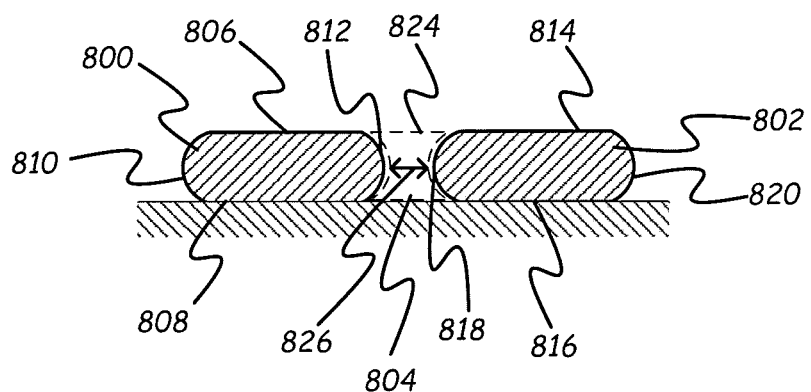
FIG. 8 is a sectional view of the spaced roads of FIG. 7.

FIG. 7 provides a top view of two spaced roads 800 and 802 printed in accordance with one embodiment and FIG. 8 provides a sectional view along lines 8-8 of FIG. 7. Road 800 includes flat top and bottom surfaces 806 and 808 and rounded side surfaces 810 and 812. Similarly, road 802 includes flat top and bottom surfaces 814 and 816 and rounded side surfaces 818 and 820. Controller 38 causes roads 800 and 802 to be printed based on two tool paths that controller 38 receives. The positions of the two tool paths are set such that roads 800 and 802 are separated by a space or void 804. Space or void 804 has a bead area 824 (FIG. 8) that extends above and below rounded side surfaces 812 and 818 and is level with top surfaces 806 and 814 and bottom surfaces 808 and 816. At the closest point between roads 800 and 802, the roads are separated by a distance 826. Distance 826 is selected so that it is large enough to permit molten material to flow between rounded surface 812 and rounded surface 818. In addition, distance 826 is selected to ensure that portions of nozzle 92 can remain in contact with top surfaces 806 and 814 while molten material is introduced into space 804. In some embodiments, distance 826 is selected so that it is smaller than orifice 95 of nozzle 92.

Figure 9:
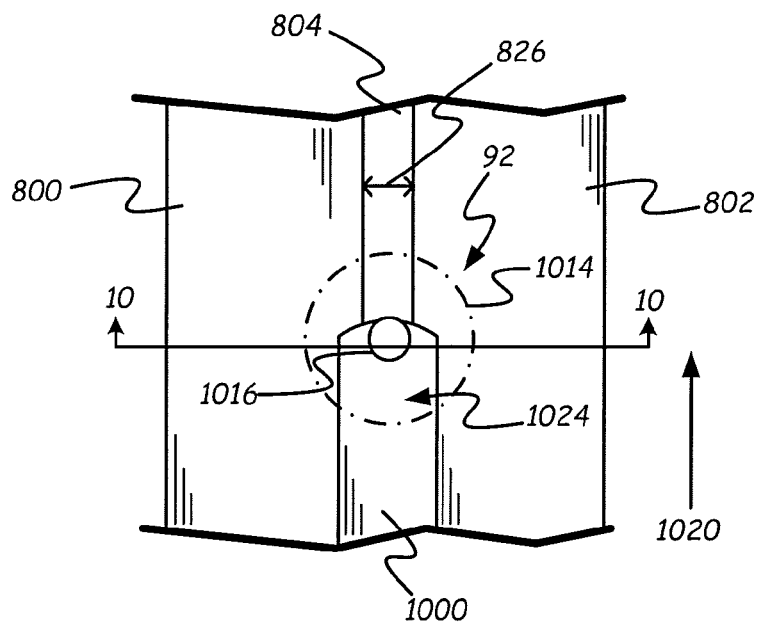
FIG. 9 is a top view showing a nozzle filling the voids between the two roads of FIG. 7.
Figure 10:
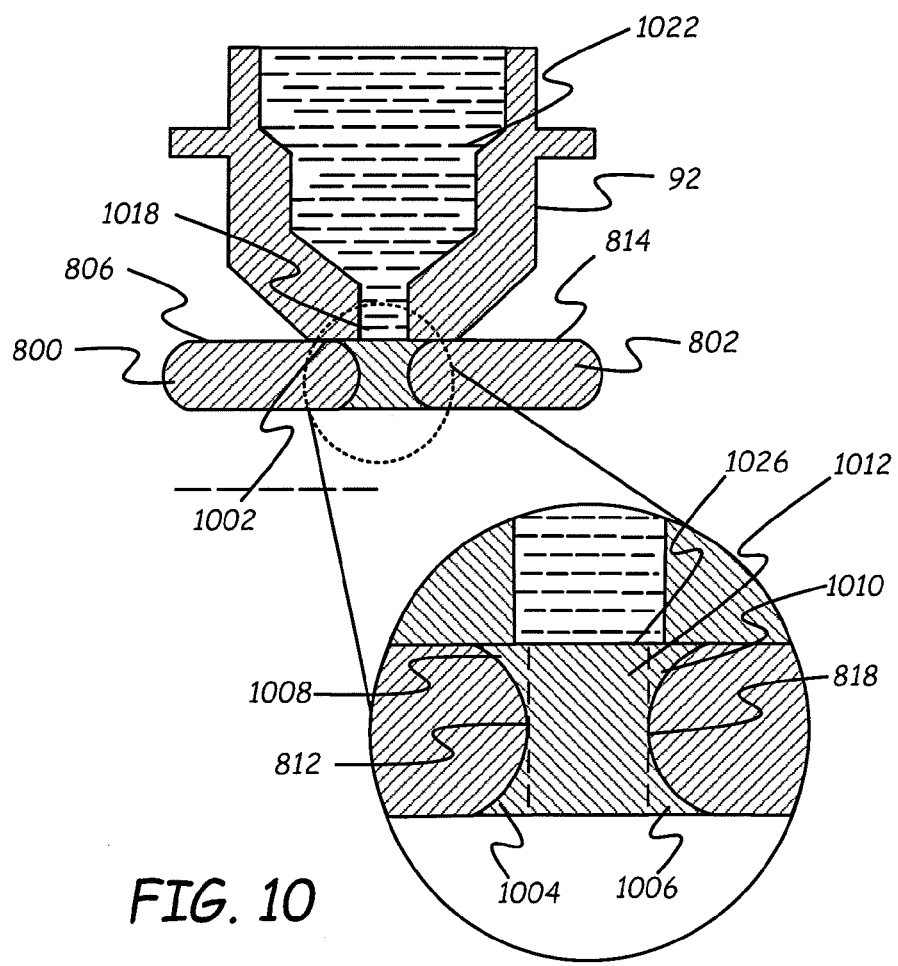
FIG. 10 is a sectional view of FIG. 9.

FIGS. 9 shows a top view of a nozzle 92 moving along a void filling tool path while filling void or space 804. FIG. 10 shows a sectional view taken along lines 10-10 of FIG. 9. As shown in FIG. 10, the void filling tool path received by controller 38 is set such that a bottom surface of nozzle 92 is in contact with both top surface 806 of spaced road 800 and top surface 814 of spaced road 802. In FIG. 9, the outer circumference 1014 of bottom surface 1002 is shown in phantom. Orifice 95 of nozzle 92, has an outer circumference 1016, and is positioned over space 804. In FIG. 9, controller 38 is sending control signals to move nozzle 92 in a direction 1020 along the void filling tool path while also sending control signals to cause molten material (also referred to as liquefied material) 1022 to be extruded by orifice 95 thereby forming fill road 1000. Because bottom surface 1002 is sealed against top surfaces 806 and 814 of spaced roads 800 and 802, the pressure of molten material 1022 causes molten material 1022 to be injected into void 804 so that the molten material fills all of bead area 824 of void 804. For example, molten material is injected into void areas 1004 and 1006 below rounded side surfaces 812 and 818 and into void areas 1008 and 1010 above rounded side surfaces 812 and 818 of spaced roads 800 and 802. In addition, molten material fills central void 1012 between the outermost portions of rounded side surfaces 812 and 818. As nozzle 92 moves along the void-filling tool space associated with space 804, molten material 1022 fills each of the void areas along the path thereby filling volumes above and below rounded side surfaces 812 and 818.

Portion 1024 of nozzle bottom surface 1002 smooths the top of the molten material to form a flat top surface 1026 on fill road 1000 that is level with top surfaces 806 and 814 of spaced roads 800 and 802. Thus, spaced roads 800 and 802 and fill road 1000 together provide a smoother top surface than prior art roads, such as those shown in FIGS. 5 and 6 where the rounded sides of the roads create a top void 516 that makes the top surface of the part rough.

The amount of molten material 1022 extruded through orifice 95 when printing fill road 1000 is calculated based on the size of bead area 824. As shown in FIGS. 11 and 12, for roads of the same height and profile, the bead area between two roads includes a fixed component and a variable component that varies with the distance between the spaced roads. In particular, in FIGS. 11 and 12, two spaced roads 1100 and 1102 are shown with two different separating distances 1104 and 1106 respectively. Bead area 1108 for separation distance 1104 includes a fixed component constructed from void areas 1110, 1112, 1114 and 1116 and a central bead area 1118. Bead area 1120 of FIG. 12 consists of the same fixed component as bead area 1108, namely void areas 1110, 1112, 1114 and 1116. But bead area 1120 has a larger central bead area 1122 than central bead area 1118. Comparing central bead areas 1118 and 1122, it can be seen that the difference in the size of these areas is simply a function of the distance between the spaced roads since the heights of the central bead areas are the same in both cases. As a result, for a given height 1140 of the spaced roads, the area for the fixed components of the bead area can be calculated once and used for all spaced roads regardless of the distance between the spaced roads while the size of the variable components 1118/1122 are computed as the product of height 1140 and the spaced distance 1104/1106 between the spaced roads.

Given the bead area between spaced roads, one or both of the volumetric flow rate of the molten material out of orifice 95 or the velocity of nozzle 92 can be altered to provide a volume of molten material that will fill the bead area as nozzle 92 moves.

Figure 13:
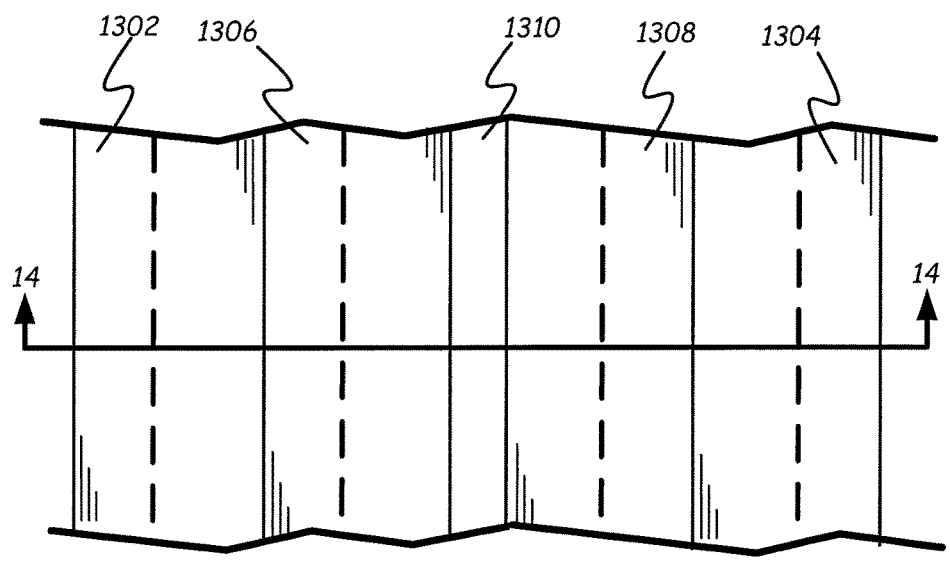
FIG. 13 is a top view showing a fill pattern of the prior art.
Figure 14:
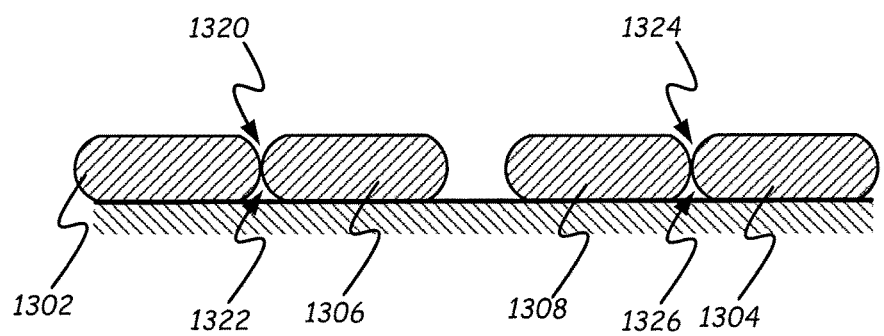
FIG. 14 is a sectional view of FIG. 13.

FIG. 13 provides a top view of a prior art perimeter and fill pattern and FIG. 14 provides a section view along lines 14-14 of FIG. 13. In FIGS. 13 and 14, two perimeter roads 1302 and 1304 have been printed and two fill roads 1306 and 1308 have then been printed to fill the space between perimeter roads 1302 and 1304. Space 1310 between fill roads 1306 and 1308 is too small to receive a printed road and as a result, space 1310 is left open under the prior art. In addition, since printed roads 1302, 1304, 1306 and 1308 each have rounded side edges, voids, such as voids 1320 and 1322 between roads 1302 and 1306 and voids 1324 and 1326 between roads 1304 and 1308 are present in the printed object. These voids along with space 1310 create points of weakness in the printed part.

Figure 15:
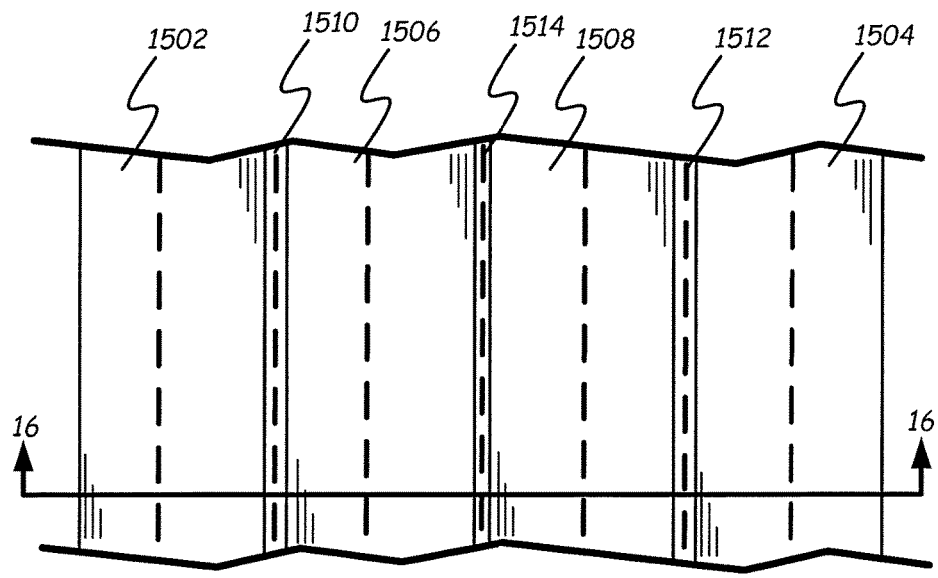
FIG. 15 is a top view of spaced apart roads in accordance with one embodiment.
Figure 16:
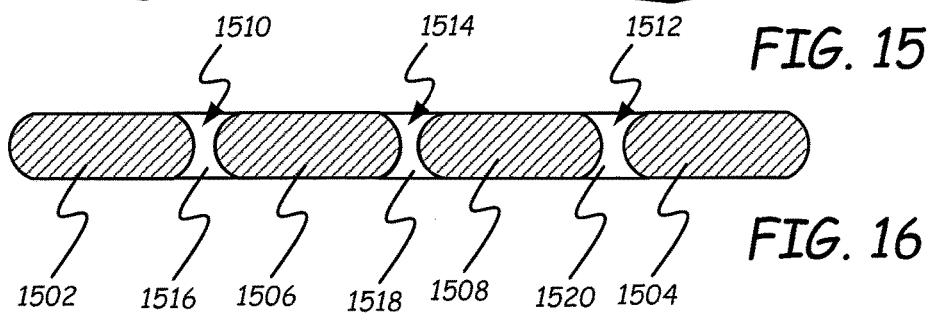
FIG. 16 is a sectional view of FIG. 15.

FIG. 15 provides a top view of two perimeter roads 1502 and 1504 and two fill roads 1506 and 1508 in accordance with one embodiment. FIG. 16 provides a section view along lines 16-16 of FIG. 15. In FIGS. 15 and 16, perimeter roads 1502 and 1504 are identical to perimeter roads 1302 and 1304 of FIG. 13. Fill roads 1506 and 1508, however, are positioned differently than fill roads 1306 and 1308. In particular, controller assembly 38 has printed road 1506 to create a space 1510 between road 1506 and perimeter road 1502. Similarly, road 1508 has been printed to create a space 1512 between fill road 1508 and perimeter road 1504. While roads 1506 and 1508 have been printed along tool paths that create spaces 1510 and 1512, they remain separated from each other by a space 1514. Each of spaces 1510, 1512 and 1514 have a respective bead area 1516, 1518 and 1520. Each bead area extends below and above the rounded side surfaces of the neighboring spaced roads and includes a top surface and a bottom surface that are level with the top surfaces and bottom surfaces, respectively, of the neighboring spaced roads.

Figure 17:
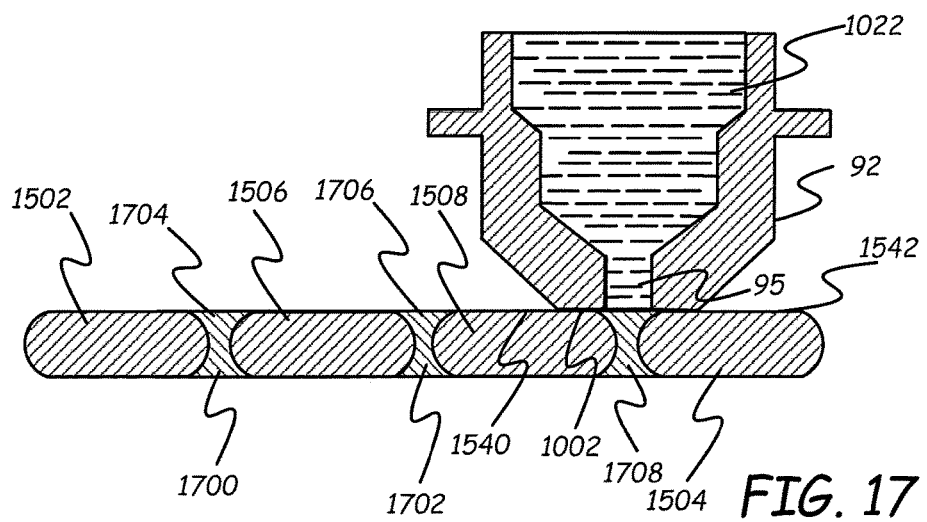
FIG. 17 is the sectional view of FIG. 16 while the voids in FIG. 16 are being filled.

FIG. 17 shows the sectional view of FIG. 16 after bead areas 1516 and 1518 have been filled with fill roads 1700 and 1702, respectively, and while nozzle 92 is filling bead area 1520 with a fill road 1708. Fill roads 1700 and 1702 fill the entirety of bead areas 1516 and 1518, respectively and include top surfaces 1704 and 1706 that are flat and in the same plane as the top surfaces of spaced roads 1502, 1506 and 1508. While filling bead area 1520, controller assembly 38 moves nozzle 92 along a void filling path so that bottom surface 1002 of nozzle 92 is in contact with top surface 1540 of road 1508 and with top surface 1542 of road 1504. As a result, molten material 1022 is extruded through orifice 95 and is injected into the entirety of bead area 1520 including the portions of the bead area that are beneath and above the curved surfaces of roads 1508 and 1504. The combination of the spaced roads and the fill roads forms a stronger and smother final layer in the embodiment of FIG. 17 than the fill patterns of the prior art.

Figure 18:
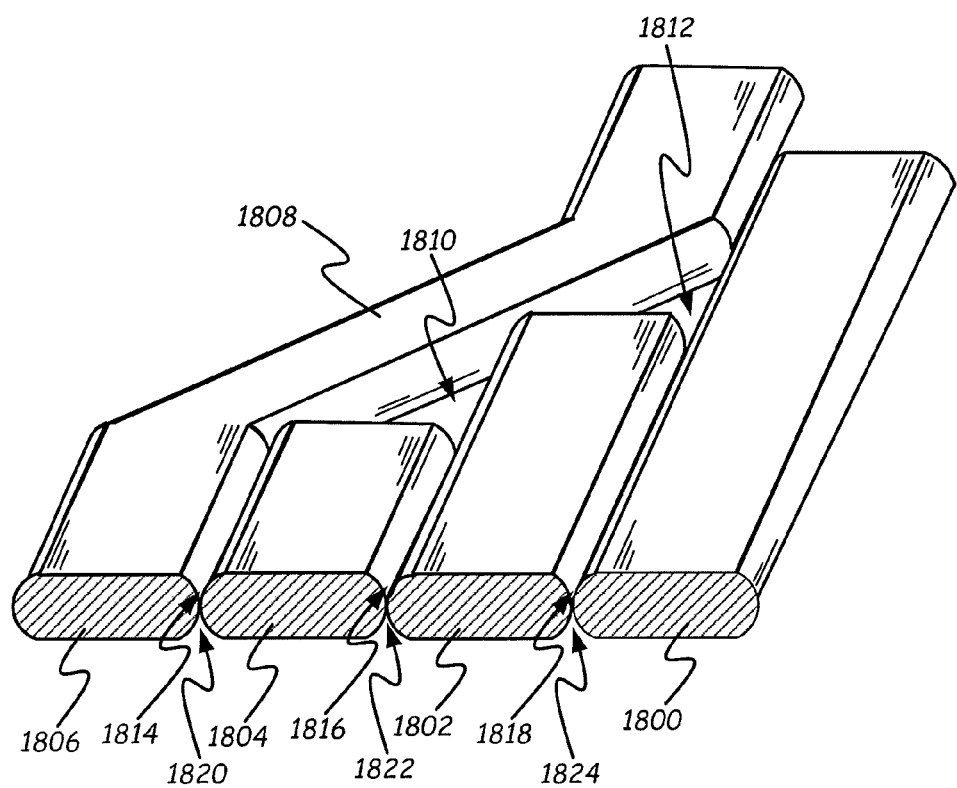
FIG. 18 is a perspective view of a fill pattern under the prior art.

FIG. 18 provides a perspective view of three fill roads 1800, 1802 and 1804 relative to a perimeter road 1806 that includes an angled portion 1808 under the prior art. As shown in FIG. 18, under the prior art, at the junction between fill roads 1804 and 1802 and angled portion 1808, two triangular voids 1810 and 1812 are formed. In addition, voids 1814, 1816, 1818, 1820, 1822, and 1824 are formed between the neighboring roads of the prior art. These voids create weakness in the parts of the prior art and create roughness on the top surface of parts of the prior art.

Figure 19:
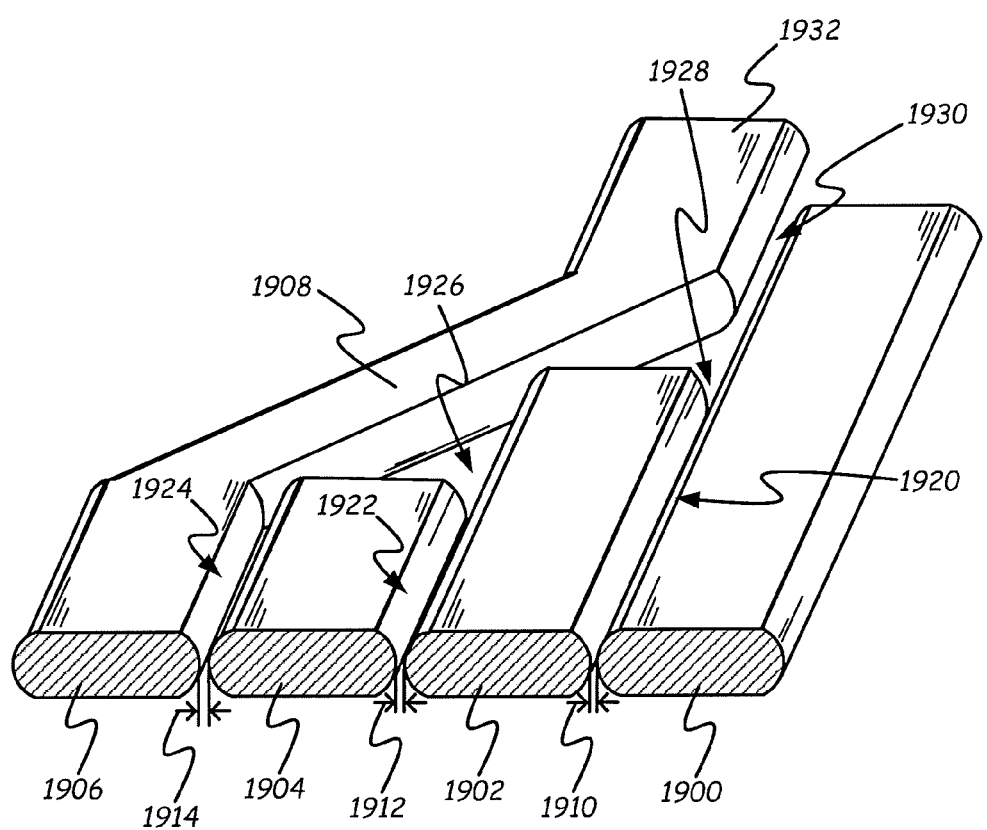
FIG. 19 is a perspective view of spaced roads for a fill pattern in accordance with one embodiment.

FIG. 19 provides a perspective view of a fill pattern relative to a perimeter with an angled portion in accordance with some embodiments. In FIG. 19, controller assembly 38 has printed fill roads 1900, 1902 and 1904 and a perimeter road 1906 that has an angled portion 1908. Perimeter road 1906 is identical to perimeter road 1806 of FIG. 18. Roads 1900, 1902 and 1904 are similar to roads 1800, 1802 and 1804 of the prior art but are spaced apart from each other by respective distances 1910, 1912 and 1914. As a result, controller assembly 38 create voids 1920, 1922 and 1924 between roads 1900, 1902, 1904 and 1906 as well as triangular voids 1926 and 1928 between roads 1900, 1902, 1904 and angled portion 1908 of road 1906. In addition, there is a void 1930 between a straight portion 1932 of road 1906 and road 1900. The distances 1910, 1912 and 1914 between the spaced roads are selected to allow molten material to flow between the roads while ensuring that during the process of depositing the fill roads a portion of the bottom surface 1002 of nozzle 92 remains in contact with previously deposited spaced roads and/or previously deposited fill roads.

Figure 20:
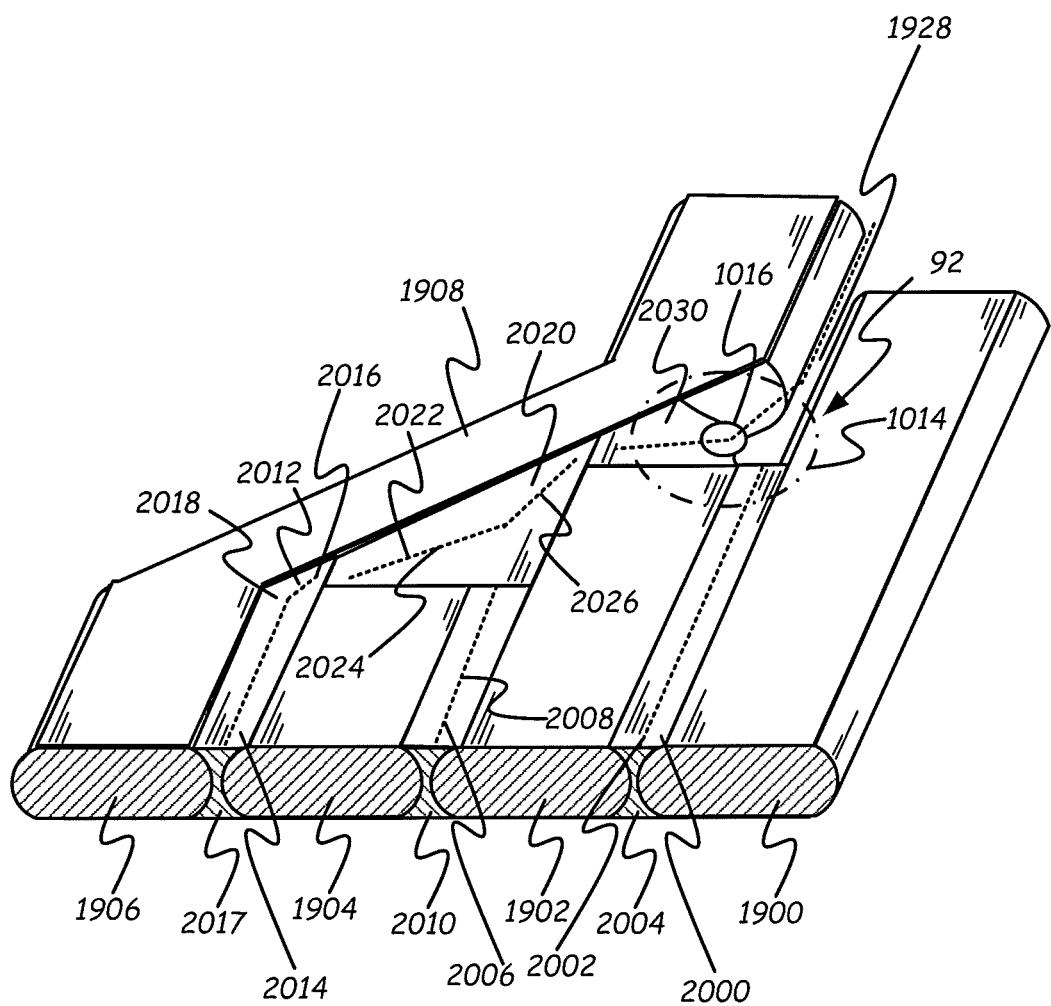
FIG. 20 is a perspective view of the fill pattern of FIG. 19 during the filling of voids of the spaced roads.

After controller assembly 389 prints the spaced roads of FIG. 19, controller assembly 38 fills the voids between the spaced roads by moving nozzle 92 along a collection of void filling paths as shown in the perspective view of FIG. 20. In FIG. 20, void filling road 2000 has been deposited between spaced roads 1900 and 1902 by moving the center of nozzle 92 along a void filling path 2002 such that a bottom surface of nozzle 92 remains in contact with the top surfaces of roads 1900 and 1902 while molten material is extruded from orifice 95 of nozzle 92. Because nozzle 92 is sealed against roads 1900 and 1902 when void filling road 2000 is extruded, the fill material is injected to fill the entirety of bead area 2004 between roads 1900 and 1902. Similarly, void filling road 2006 has been deposited by moving the center of nozzle 92 along void filling path 2008 to completely fill bead area 2010 between roads 1902 and 1904.

Between roads 1904 and 1906, nozzle 92 has been moved along a void filling path 2012 that includes a straight portion 2014 and an angled portion 2016 to form a void filling road 2018. Void filling road 2018 completely fills bead area 2017 between roads 1904 and 1906. Bead area 2017 has a constant value along straight portion 2014 of tool path 2012 and has a decreasing value along angled portion 2016 as the distance between road 1906 and road 1904 decreases due to angled portion 1908 moving toward road 1904. Thus, along straight tool path portion 2014, the volume of molten material extruded by nozzle 92 remains constant while along angled portion 2016, the volume of molten material extruded by nozzle 92 decreases as nozzle 92 moves along angled portion 2016. To determine the volume of molten material that needs to be extruded, the size of a plurality of different bead areas is determined at a plurality of different positions along the void filling path between the two roads.

An additional void filling road 2020 has been deposited between angled portion 1908 and spaced roads 1904 and 1902 and fill roads 2018 and 2006. In particular, nozzle 92 has been moved along void filling path 2022, which includes portions 2024 and 2026. In moving along void filling path 2022, bottom surface 1002 of nozzle 92 is initially in contact with angled portion 1908 of road 1906, a portion of void filling road 2108 and with road 1904. Eventually, bottom surface 1002 transitions into contact with just angled portion 1908 and spaced road 1904 and then into contact with angled portion 1908 and void filling road 2006. Bottom surface 1002 then comes in contact with angled portion 1908 and road 1902. Along the entirety of void filling path 2022, bottom surface 1002 of nozzle 92 is in contact with at least two previously deposited roads, either spaced roads or previously deposited void filling roads. Also, along void filling path 2022, controller assembly 38 determines the size of a plurality of different bead areas at a plurality of respective positions.

In FIG. 20, nozzle 92 is currently filling void 1928 and is in contact with the top surfaces of angled portion 1908 of road 1906, road 1902, void filling road 2000, and road 1900. As a result, molten material extruded by nozzle 92 is injected into void 1928 such that it fills portions of the void under the curved side surface of road 1906 and curved side surface of road 1900. When filling void 1928 and void 1930, nozzle 92 moves along tool path 2030. As it moves along tool path 2030, the bead area being filled varies. As a result, the molten material and/or the velocity of nozzle 92 is adjusted so that the volume of molten material extruded from nozzle 92 fills the entire bead area as nozzle 92 moves along tool path 2030 without providing an excess amount of molten material.

Figure 21:
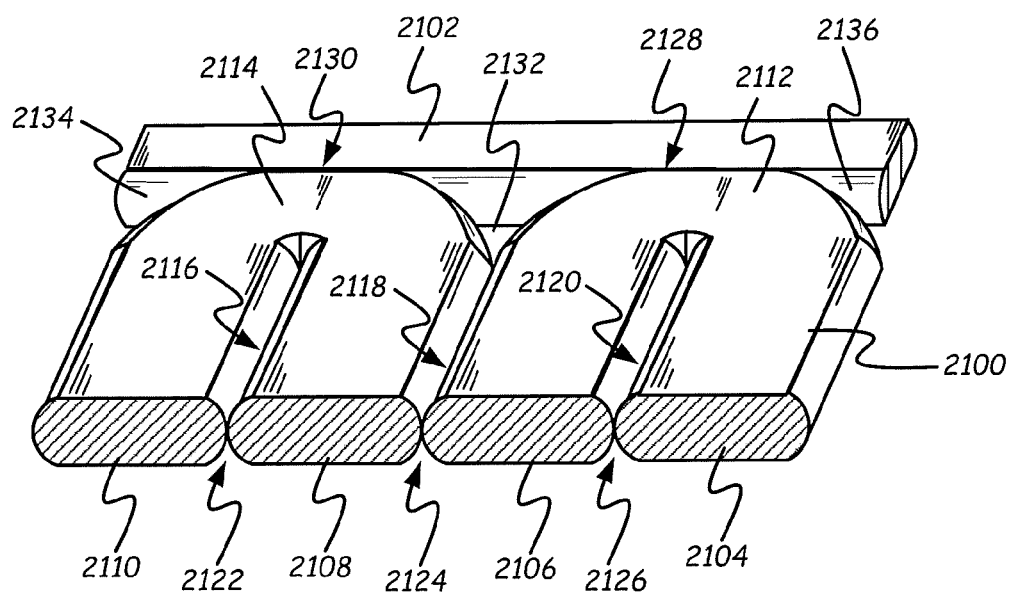
FIG. 21 is a perspective view of a prior art fill pattern at a boundary road.

FIG. 21 provides a perspective view of portions of a raster fill road 2100 and a boundary or perimeter road 2102 under the prior art. Raster fill road 2100 includes four road segments 2104, 2106, 2108 and 2110 where segments 2104 and 2106 are connected by a raster turnaround 2112 and road segments 2108 and 2110 are connected by a raster turnaround 2114 and road segments 2108 and 2106 are connected by a raster turnaround (not shown).

As shown in FIG. 21, raster road segments 2104, 2106, 2108 and 2110 have flat top and bottom surfaces and rounded side surfaces. The rounded side surfaces create voids between the road segments such as top voids 2116, 2118 and 2120 and bottom voids 2122, 2124 and 2126. Raster turnarounds 2112 and 2114 also have rounded side surfaces and in combination with the rounded side surfaces of boundary road 2102 create top and bottom voids, such as top voids 2128 and 2130. In addition, because turnarounds 2112 and 2114 are rounded instead of squared, triangular voids are formed between neighboring raster turnarounds and boundary road 2102. For example, triangular voids 2132, 2134 and 2136 are formed by neighboring turnarounds and boundary road 2102. The various voids in the prior art raster fill create weakness in the part and cause the top surface of the part to have a rough finish.

Figure 22:
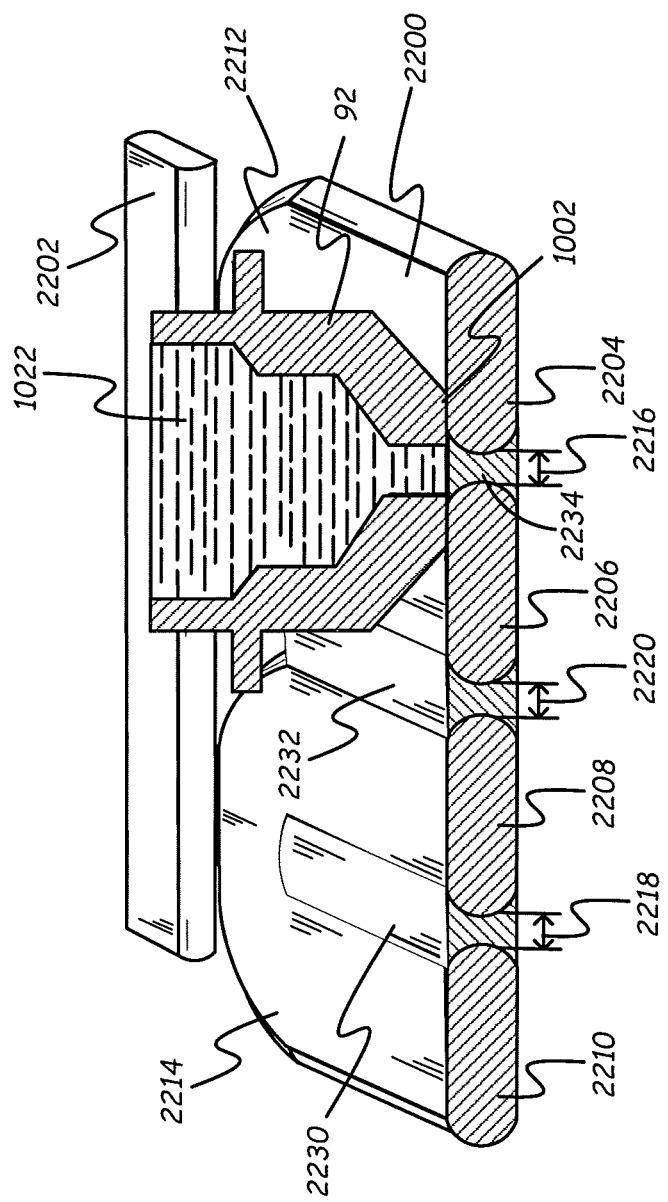
FIG. 22 provides a perspective view of a fill pattern at a boundary road in accordance with one embodiment during the filling of voids between spaced roads.

FIG. 22 provides a perspective view of a raster fill road 2200 and a boundary or perimeter road 2202 in accordance with one embodiment. Raster fill road 2200 includes raster fill segments 2204, 2206, 2208 and 2210 with raster segments 2204 and 2206 connected by a raster turnaround 2212, raster segments 2208 and 2210 connected by a raster turnaround 2214, and raster segments 2206 and 2208 connected by a raster turnaround (not shown). Raster segments 2204 and 2206 are separated from each other by a distance 2216, raster segments 2208 and 2210 are separated from each other by a distance 2218 and raster segments 2206 and 2208 are separated from each by a distance 2220. In addition, raster turnarounds 2212 and 2214 are spaced from boundary road 2202.

In FIG. 22, two void filling roads 2230 and 2232 have been printed with void filling road 2230 between road segments 2208 and 2210 and void filling road 2232 between road segments 2206 and 2208. Both void filling roads 2230 and 2232 fill the entire bead area between their respective raster road segments. In addition, both void filling roads 2230 and 2232 have top surfaces that are aligned with the top surfaces of raster roads 2206, 2208 and 2210. Controller assembly 38 forms void filling roads 2230 and 2232 by moving nozzle 92 along a void filling path such that bottom surface 1002 of nozzle 92 is in contact with two neighboring raster road segments to seal the bottom surface of nozzle 92 to the raster roads. As a result, the pressure in molten material 1022 causes the molten material to be injected beneath and above the rounded side surfaces of the raster road segments.

In FIG. 22, nozzle 92 is filling the void between raster road segments 2204 and 2206 and bottom surface 1002 of nozzle 92 is in contact with and sealed by the top surfaces of raster road segments 2204 and 2206 while molten material is injected into the bead area between the two road segments to produce void filling road 2234. Void filling road 2234 fills the entire bead area between road segments 2206 and 2204 including the voids above and below the curved side surfaces of road segments 2206 and 2204. In addition, void filling road 2234 has a top surface that is aligned with the flat surfaces of road segments 2204 and 2206.

Figure 23:
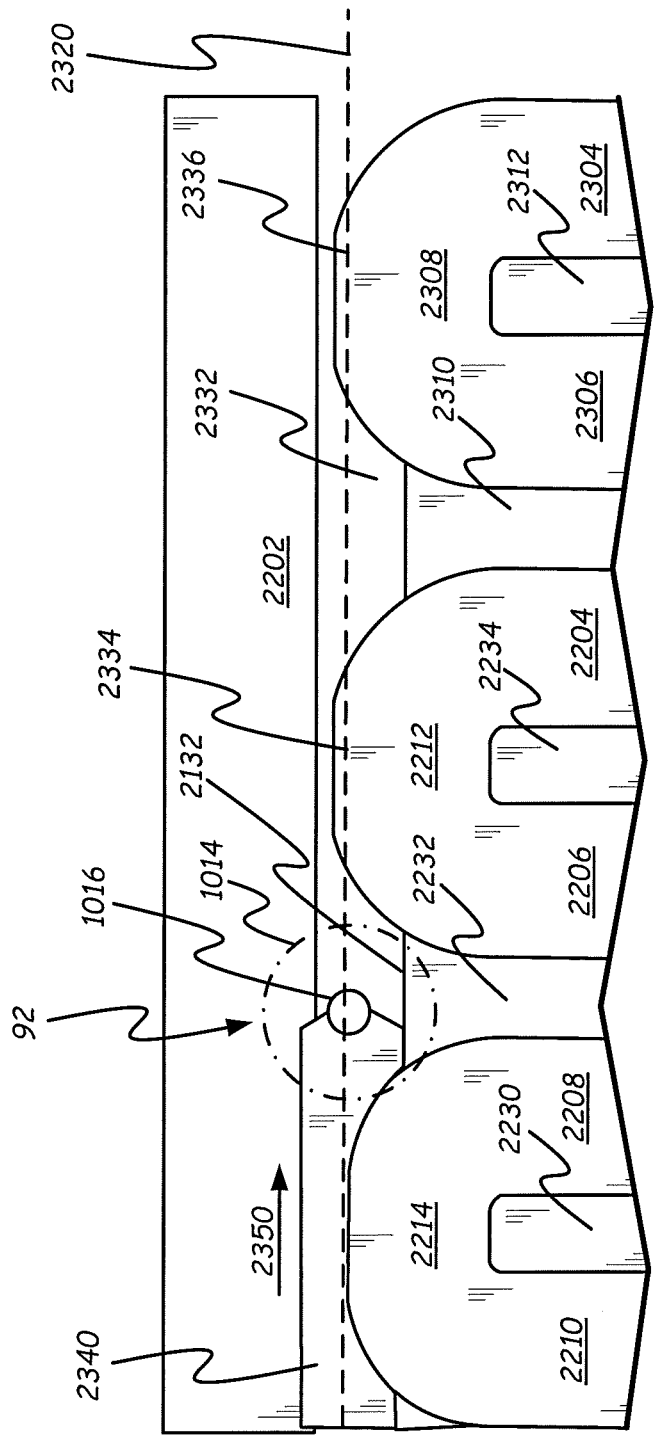
FIG. 23 is a top view of a fill pattern at a boundary in accordance with one embodiment during the filling of the voids between the boundary and the fill pattern.

FIG. 23 shows a top view of FIG. 22 with an additional two raster segments 2304 and 2306 that are connected by a raster turnaround 2308, where raster segment 2306 is connected to a raster segment 2204 by a raster turn around (not shown). FIG. 23 also includes additional void filling roads 2310 and 2312 with void filling road 2310 being between raster road segments 2306 and 2204 and void filling road 2312 being between raster road segments 2304 and 2306. In FIG. 23, nozzle 92 is filling the void between the raster turnarounds 2214, 2212 and 2308 and perimeter or boundary road 2202 by following void filling path 2320. In particular, nozzle 92 is filling voids 2132 and 2332, which are each formed by two neighboring raster turnarounds and boundary road 2202. In addition, tool path 2320 fills the space between the turnarounds and boundary road 2202, such as voids 2334 and 2336. By filling the voids, nozzle 92 is constructing void filling road 2340. Along void filling path 2320, the bottom surface 1002 of nozzle 92 is in contact with the top surface of at least two roads such that the pressure of the molten material causes the molten material to be injected beneath the rounded surfaces of the raster turnarounds and boundary road 2202. Further, the bottom surface 1002 of nozzle 92 smooths the top surface of fill road 2340 so that it is level with the top surfaces of boundary road 2202 and raster turnarounds 2214, 2212, and 2308.

As shown in FIG. 23, the spacing between boundary road 2202 and the raster turnarounds is different from the spacing between boundary road 2202 and void filling roads 2232 and 2310. As a result, controller assembly 38 determines different bead area sizes at different positions along void filling path 2320 and the volume of molten material deposited in the voids varies as nozzle 92 moves along void filling path 2320 in direction 2350. For example, more molten material is deposited when nozzle 92 is over void 2132 than when nozzle 92 is over void 2334. The amount of extruded material can be varied by changing the volumetric flow rate of molten material out of orifice 95 and/or by varying the velocity of nozzle 92.

As discussed above, the amount of molten material extruded at each point along a void filling path can be set based on the bead area at that point. This bead area can be calculated based on the positon and geometry of the previously deposited roads which are being used to seal the bottom surface of the nozzle. In some embodiments, the bead area changes along the void filling path and a different bead area is determined at different positions along the void filling path. In other embodiments, the bead area is not calculated but instead the volumetric flow rate of molten material and/or the velocity of the head are altered to maintain a desired pressure in the molten material within the nozzle. When the pressure in the nozzle is below a desired pressure, the volumetric flow rate of the molten material (the amount of extruded material) is increased and/or the speed of the nozzle is decreased so as to increase the pressure of the molten material and thereby inject the molten material into the entire bead area of the voids. Similarly, if the pressure exceeds a threshold such that the molten material is climbing the exterior of nozzle 92 or spreading along the top surface of the previously printed roads, the volumetric flow rate of the molten material (the amount of extruded material) is decreased and/or the velocity of nozzle 92 is increased so that the pressure of the molten material in nozzle 92 decreases.

Figure 24:
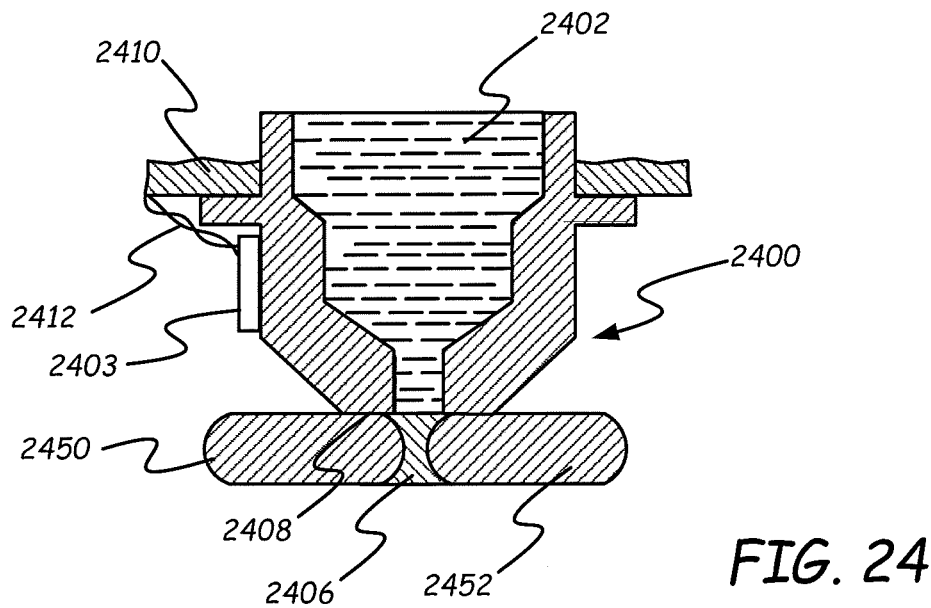
FIG. 24 is a sectional view of a nozzle in accordance with one embodiment.

FIG. 24 provides a sectional view of a nozzle 2400 that maintains a pressure of molten material 2402 in nozzle 2400 within a desired pressure range. In particular, nozzle 2400 includes a strain gauge 2403 mounted on the side of nozzle 2400 that is used to indirectly measure the pressure of molten material 2402. A bottom surface 2408 of nozzle 2400 is positioned on roads 2450 and 2452 and nozzle 2400 is extruding molten material 2402 into void 2406. As void 2406 fills, molten material in void 2406 provides a back pressure to molten material 2402 in nozzle 2400 and to bottom surface 2408. Since the top of nozzle 2400 is securely fixed to housing 2410, the increased pressure on bottom surface 2408 creates a strain on nozzle 2400 which is measured by strain gauge 2403. Strain gauge 2403 provides a sensor signal or strain signal along conductors 2412 that indicates the strain on nozzle 2400. Controller assembly 38 uses the sensor signals on conductors 2412 to adjust one or more of the volumetric flow rate of molten material 2402 and the velocity of nozzle 2400 to maintain the sensed strain in a desired range. This desired range is set so that the pressure of the molten material 2402 is sufficient to drive or inject the molten material around the rounded surfaces of the previously deposited roads 2450 and 2452 while being low enough that molten material 2402 does not escape between bottom surface 2408 of nozzle 2400 and the top surfaces of roads 2450 and 2452.

Figure 25:
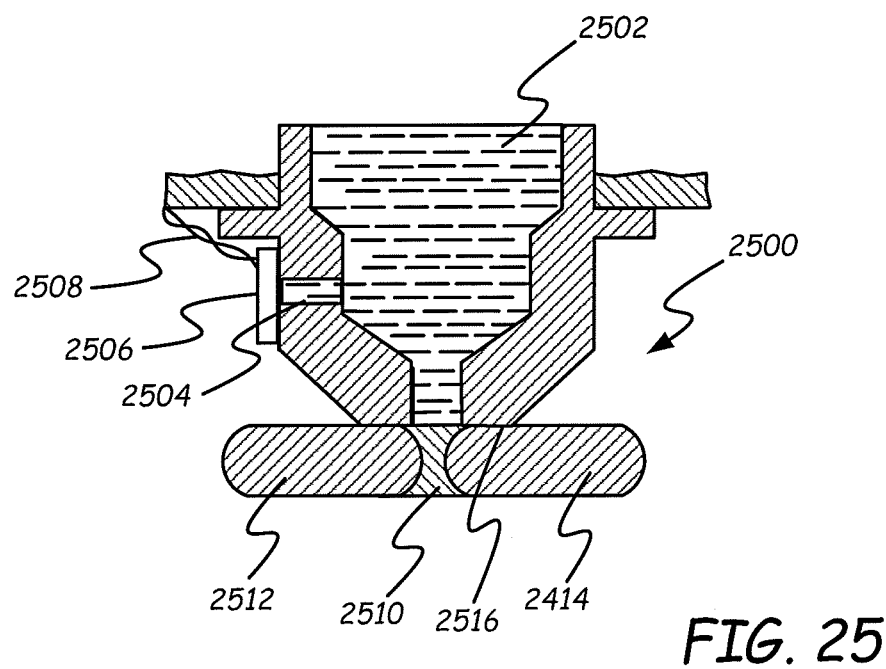
FIG. 25 provides a sectional view of a nozzle in accordance with a second embodiment.

FIG. 25 provides a sectional view of a nozzle 2500, which is used to maintain molten material 2502 in nozzle 2500 within a desired pressure range, in accordance with a further embodiment. Nozzle 2500 includes a sidewall through-hole 2504 and a pressure sensor 2506. Molten material 2502 passes through hole 2504 so that the pressure of molten material 2502 can be sensed by pressure sensor 2506. Pressure sensor 2506 provides a sensor value along conductors 2508 to controller assembly 138. Based on the sensor values, controller assembly 38 alters the volumetric flow rate of molten material 2502 and/or the velocity of nozzle 2500 to maintain the pressure of molten material 2502 within a desired pressure range. This pressure range will ensure that the molten material is injected into the entire bead area of the void or space 2510 between two previously deposited roads 2512 and 2514 while also preventing excess molten material from spilling out between the bottom surface 2516 of nozzle 2500 and the top surfaces of previously deposited roads 2512 and 2514.

Figure 26:
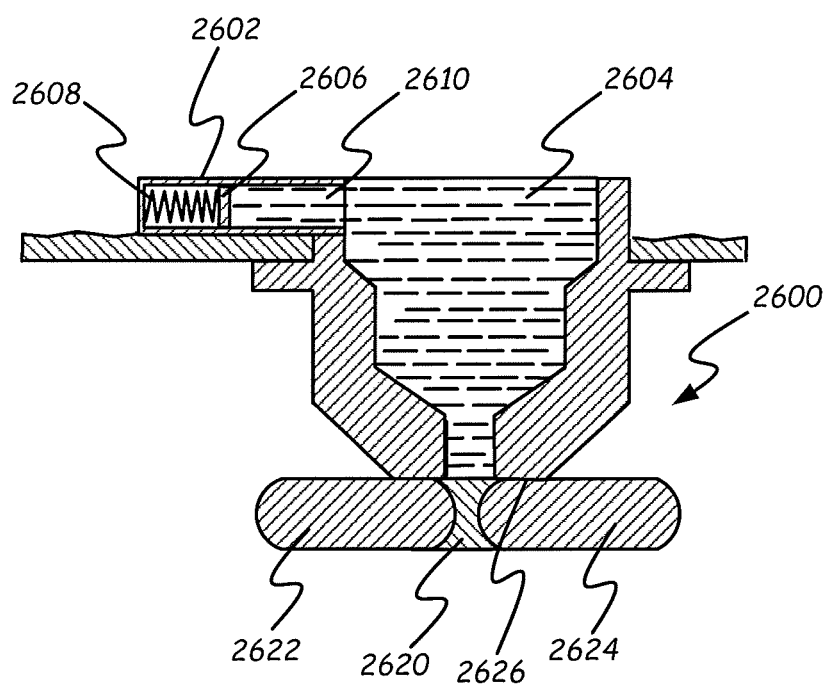
FIG. 26 provides a sectional view of a nozzle in accordance with a third embodiment.

FIG. 26 provides an example of a nozzle 2600 that uses an accumulator 2602 to maintain the pressure of a molten material 2604 within a desired range. Accumulator 2602 is fluidically coupled to the interior of nozzle 2600 such that molten material 2604 can move freely between the interior of accumulator 2602 and the interior of nozzle 2600. In particular, accumulator 2602 includes a piston 2606 that is biased by a spring 2608 and moves within a cylinder 2610. When the pressure of molten material 2604 exceeds a threshold, the molten material presses against piston 2606 and spring 2608 causing the pressure of molten material 2604 to drop. Conversely, when the pressure in the molten material 2604 drops below the threshold, spring 2608 drives piston 2606 to push molten material out of cylinder 2610 and thereby increase the pressure of molten material 2604. Thus, accumulator 2602 provides an open loop pressure compensator that is able to maintain the pressure of molten material 2604 so that the molten material fills the entire bead area 2620 between two neighboring roads 2622 and 2624 without causing the molten material to be forced between bottom surface 2626 of nozzle 2600 and the top surfaces of roads 2622 and 2624.

Figure 27:
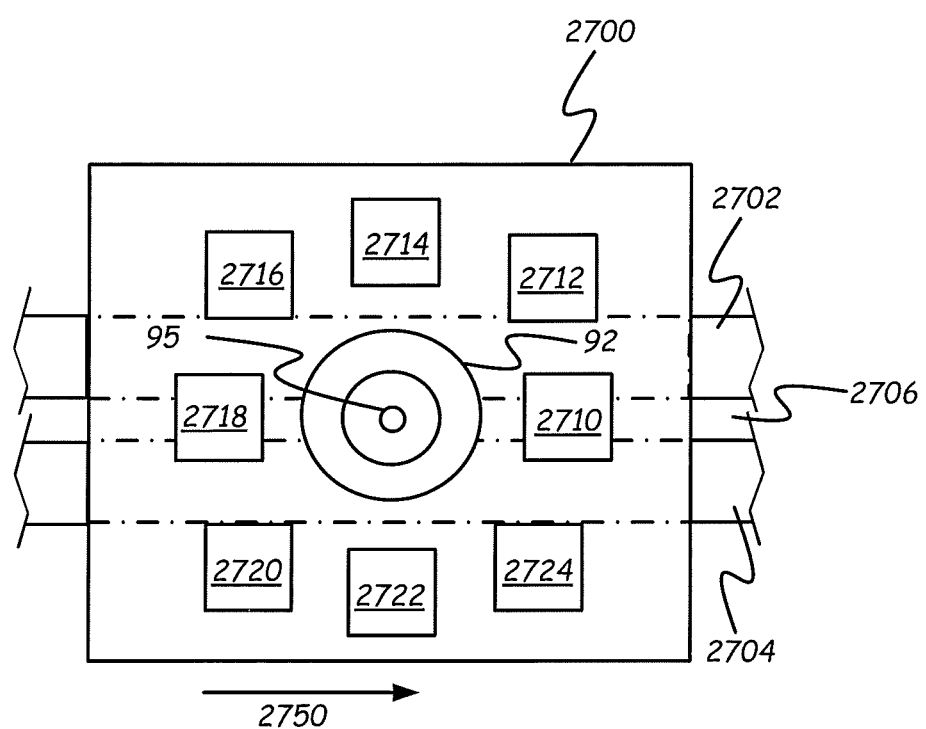
FIG. 27 provides a top sectional view of a portion of a print head in accordance with one embodiment.

FIG. 27 provides a top-down sectional view of a print head 2700 in accordance with a further embodiment. Print head 2700 includes nozzle 92 having orifice 95. Print head 2700 is positioned over two previously printed roads 2702 and 2704 such that a bottom surface of nozzle 92 is sealed by the top surfaces of roads 2702 and 2704 and orifice 95 is positioned over a void 2706 between roads 2702 and 2704. Print head 2700 also includes a collection of radar transceivers 2710, 2712, 2714, 2716, 2718, 2720, 2722, and 2724. Each radar transceiver is able to transmit an electromagnetic signal toward the part being constructed and to receive reflected electromagnetic signals from the part. In addition, each radar transceiver generates a radar sensor signal indicative of the strength of the signal it receives. For example, radar transceiver 2710 is able to receive reflected signals from road 2702, 2704 and the surface below void 2706 and based on the strength of those signals generate a radar sensor signal. The strength of the reflected signal is indicative of the size of the bead area of void 2706 and thus radar transceivers are able to sense the size of the bead area. The sensor signal is provided to controller assembly 38, which uses the sensor signal to determine the size of the bead area and to adjust one or more of the volumetric flow rate or the velocity of nozzle 92 to fill that bead area when nozzle 92 reaches the position measured by transceiver 2710. In the description above, the sensor signal from transceiver 2710 was used because print head 2700 is moving in direction 2750 and as such, radar transceiver 2710 is leading nozzle 92. The collection of radar sensors is provided so that regardless of the direction of travel of nozzle 92, the bead area of the void being filled can be measured by at least one of the radar transceivers before nozzle 92 reaches the void.

Figure 28:
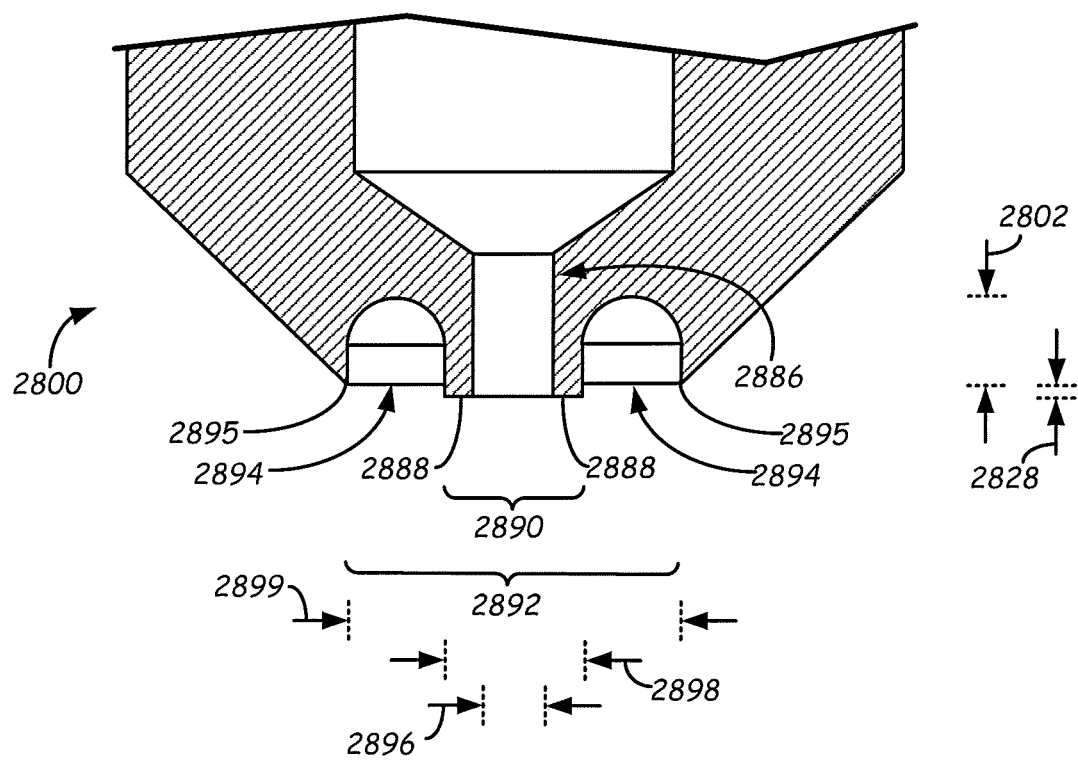
FIG. 28 provides a sectional view of a nozzle tip in accordance with some embodiments.

FIG. 28 provides a sectional view of a nozzle tip 2800 that can be used as the end of nozzle 92 with the various embodiments described above. Nozzle tip 2800 includes inner ring or annulus 2890, outer ring or annulus 2892, and an annular recessed groove 2894 located circumferentially between inner ring 2890 and outer ring 2892.

Inner ring 2890 extends circumferentially between tip pipe 2886 and recessed groove 2894, and has bottom planar face 2888. Inner ring 2890 is suitable for printing roads between two previously printed roads so as to inject material below the sides of the two previously printed roads. Outer ring 2892 extends circumferentially around inner ring 2890 and recessed groove 2894, and has a knife-edge or substantially knife-edge face 2895. Outer ring 2892 seals against the top surfaces of the previously deposited roads.

Recessed groove 2894 is an annular groove milled or otherwise formed in tip 2800 to separate and define inner ring 2890 and outer ring 2892. The dimensions of inner ring 2890, outer ring 2892, and recessed groove 2894 may vary depending on the desired extrusion profiles. Examples of suitable inner diameters for inner ring 2890 (referred to as inner diameter 2896, corresponding to the diameter of tip pipe 2886) range from about 130 micrometers (about 0.005 inches) to about 640 micrometers (about 0.025 inches), with particularly suitable inner diameters ranging from about 250 micrometers (about 0.01 inches) to about 500 micrometers (about 0.02 inches). Examples of suitable outer diameters for inner ring 2890 (referred to as outer diameter 2898) range from about 500 micrometers (about 0.02 inches) to about 1,300 micrometers (about 0.05 inches), with particularly suitable outer diameters ranging from about 640 micrometers (about 0.025 inches) to about 900 micrometers (about 0.035 inches), where outer diameter 2898 is greater than inner diameter 2896. Examples of suitable knife-edge diameters for outer ring 2892 (referred to as knife-edge diameter 2899) range from about 1,500 micrometers (about 0.06 inches) to about 2,500 micrometers (about 0.10 inches), with particularly suitable diameters ranging from about 1,800 micrometers (about 0.07 inches) to about 2,300 micrometers (about 0.09 inches).

Suitable inner and outer diameters for recessed groove 2894 correspond respectively to outer diameter 2898 (of inner ring 2890) and knife-edge diameter 2899 (of outer ring 2892). Examples of suitable average depths from bottom face 2888 for recessed groove 2894 (referred to as depth 2802) include depths of at least about 250 micrometers (about 0.01 inches), and more desirably range from about 500 micrometers (about 0.02 inches) to about 1,300 micrometers (about 0.05 inches). As can be seen, recessed groove 2894 is desirably at least a wide as deep.

Although the present disclosure has been described with reference to preferred embodiments, workers skilled in the art will recognize that changes may be made in form and detail without departing from the spirit and scope of the disclosure.

The invention claimed is:

1. A method of additive three-dimensional object production comprising:

depositing liquefied material to produce two roads;

placing an extruder tip having a bottom surface that surrounds an orifice such that one portion of the bottom surface is sealed against one of the two roads and another part of the bottom surface is sealed against the other of the two roads and the orifice is positioned over a space between the two roads; and extruding liquefied material through the orifice to fill the space between the two roads.

2. The method of claim 1 wherein each road has rounded sides such that extruding liquefied material through the orifice to fill the space between the two roads comprises filling volumes above and below the rounded sides of each road.

3. The method of claim 2 wherein extruding liquefied material through the orifice to fill the space between the two roads comprises determining a bead area between the two roads based at least on the position and height of the two roads and setting a velocity of the extruder tip and a volumetric flow rate of liquefied material extruded by the extruder tip to provide enough liquefied material to fill the bead area as the extruder tip moves at the velocity.

4. The method of claim 3 wherein determining a bead area comprises determining a plurality of different bead areas between the two roads, each bead area associated with a different position of the extruder tip along the two roads.

5. The method of claim 1 wherein depositing liquefied material to produce two roads comprises depositing the liquefied material to ensure that the two roads are spaced apart from each other along at least a portion of the two roads.

6. The method of claim 1 wherein the space between the roads is smaller than the orifice.

7. The method of claim 1 wherein extruding liquefied material through the orifice to fill the space between the two roads comprises sensing a pressure of the liquefied material and adjusting a volume flow rate of the liquefied material based on the sensed pressure.

8. The method of claim 1 wherein extruding liquefied material through the orifice to fill the space between the two roads comprises sensing a strain on the extruder tip and adjusting the volume flow rate of the liquefied material based on the strain.

9. The method of claim 1 wherein extruding liquefied material through the orifice to fill the space between the two roads comprises providing an accumulator that is fluidically coupled to an interior of the extruder tip such that liquefied material enters the accumulator when a pressure of the liquefied material in the extruder tip exceeds a threshold pressure and liquefied material exits the accumulator when the pressure of the liquefied material in the extruder tip is below the threshold pressure.

10. The method of claim 1 wherein extruding liquefied material through the orifice to fill the space between the two roads comprises sensing a size of the space between the roads using a sensor and setting a velocity of the extruder tip and a volumetric flow rate of the liquefied material to fill the sensed size.

* * * * *